United States Patent
Elmer et al.

(10) Patent No.: US 11,816,446 B2
(45) Date of Patent: Nov. 14, 2023

(54) SYSTOLIC ARRAY COMPONENT COMBINING MULTIPLE INTEGER AND FLOATING-POINT DATA TYPES

(71) Applicant: Amazon Technologies, Inc., Seattle, WA (US)

(72) Inventors: Thomas Elmer, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 16/698,838

(22) Filed: Nov. 27, 2019

(65) Prior Publication Data
US 2021/0157549 A1 May 27, 2021

(51) Int. Cl.
*G06F 7/544* (2006.01)
*G06F 15/80* (2006.01)

(52) U.S. Cl.
CPC ........ *G06F 7/5443* (2013.01); *G06F 15/8046* (2013.01)

(58) Field of Classification Search
CPC ............. G06F 7/5443; G06F 7/57–575; G06F 2207/3824; G06F 2207/3892; G06F 2207/4824; G06F 15/8046; G06F 17/16; G06N 3/063
See application file for complete search history.

(56) References Cited

U.S. PATENT DOCUMENTS

| | | |
|---|---|---|
| 4,937,774 A | 6/1990 | Malinowski |
| 5,138,695 A | 8/1992 | Means et al. |
| 5,151,953 A | 9/1992 | Landeta |
| 5,168,499 A | 12/1992 | Peterson et al. |
| 5,659,781 A | 8/1997 | Larson |
| 5,692,147 A | 11/1997 | Larsen et al. |

(Continued)

FOREIGN PATENT DOCUMENTS

| | | |
|---|---|---|
| EP | 3396524 | 10/2018 |
| WO | WO 94/10638 | 5/1994 |

(Continued)

OTHER PUBLICATIONS

Search Report and Written Opinion dated Mar. 4, 2021, issued in PCT/US2020/062337.

(Continued)

*Primary Examiner* — Jyoti Mehta
*Assistant Examiner* — Carlo Waje
(74) *Attorney, Agent, or Firm* — Knobbe, Martens, Olson & Bear LLP

(57) ABSTRACT

Systems and methods are provided to perform multiply-accumulate operations of multiple data types in a systolic array. One or more processing elements in the systolic array can include a shared multiplier and one or more adders. The shared multiplier can include a separate and/or a shared circuitry where the shared circuitry can perform at least a part of integer multiplication and at least a part of non-integer multiplication. The one or more adders can include one or more shared adders or one or more separate adders. The shared adder can include a separate and/or a shared circuitry where the shared circuitry can perform at least a part of integer addition and at least a part of non-integer addition.

20 Claims, 16 Drawing Sheets

(56) References Cited

U.S. PATENT DOCUMENTS

| | | | |
|---|---|---|---|
| 6,205,462 B1* | 3/2001 | Wyland | G06F 7/5443 708/503 |
| 6,463,453 B1 | 10/2002 | Dang | |
| 6,480,872 B1 | 11/2002 | Choquette | |
| 6,801,924 B1 | 10/2004 | Green et al. | |
| 7,814,137 B1 | 10/2010 | Mauer | |
| 8,184,696 B1 | 5/2012 | Chirila-Rus et al. | |
| 8,924,455 B1 | 12/2014 | Barman et al. | |
| 10,790,830 B1 | 9/2020 | Pugh et al. | |
| 10,817,260 B1* | 10/2020 | Huang | G06F 7/5443 |
| 10,872,295 B1 | 12/2020 | Liu et al. | |
| 10,879,904 B1 | 12/2020 | Gunter et al. | |
| 10,915,297 B1 | 2/2021 | Halutz et al. | |
| 11,113,233 B1 | 9/2021 | Volpe | |
| 11,232,062 B1 | 1/2022 | Volpe et al. | |
| 11,308,026 B1 | 4/2022 | Volpe et al. | |
| 11,308,027 B1 | 4/2022 | Volpe et al. | |
| 11,422,773 B1 | 8/2022 | Volpe et al. | |
| 11,467,806 B2 | 10/2022 | Elmer | |
| 2003/0081489 A1 | 5/2003 | Scheuerlein et al. | |
| 2004/0139274 A1 | 7/2004 | Chi-Chun | |
| 2006/0149803 A1* | 7/2006 | Siu | G06F 9/30014 712/E9.071 |
| 2007/0028076 A1 | 2/2007 | Wezelenburg | |
| 2007/0185953 A1 | 8/2007 | Prokopenko et al. | |
| 2009/0248769 A1 | 10/2009 | Chua | |
| 2011/0025900 A1 | 2/2011 | Kondo | |
| 2011/0058569 A1 | 3/2011 | Harrand | |
| 2011/0225116 A1 | 9/2011 | Gupta et al. | |
| 2016/0342890 A1 | 11/2016 | Young | |
| 2016/0342892 A1 | 11/2016 | Ross | |
| 2017/0097824 A1 | 4/2017 | Elmer et al. | |
| 2017/0103311 A1 | 4/2017 | Henry et al. | |
| 2017/0115958 A1 | 4/2017 | Martin | |
| 2017/0235515 A1 | 8/2017 | Lea et al. | |
| 2018/0164866 A1 | 6/2018 | Turakhia et al. | |
| 2018/0225116 A1 | 8/2018 | Henry et al. | |
| 2018/0314671 A1 | 11/2018 | Zhang et al. | |
| 2018/0315398 A1* | 11/2018 | Kaul | G06N 3/063 |
| 2018/0336163 A1 | 11/2018 | Phelps et al. | |
| 2018/0336164 A1 | 11/2018 | Phelps et al. | |
| 2018/0336165 A1* | 11/2018 | Phelps | G06N 3/063 |
| 2019/0026077 A1 | 1/2019 | Manzo | |
| 2019/0041961 A1 | 2/2019 | Desai et al. | |
| 2019/0079801 A1 | 3/2019 | Lyuh et al. | |
| 2019/0138882 A1 | 5/2019 | Choi et al. | |
| 2019/0236049 A1 | 8/2019 | Vantrease et al. | |
| 2019/0294413 A1* | 9/2019 | Vantrease | G06F 7/5095 |
| 2019/0311243 A1 | 10/2019 | Whatmough et al. | |
| 2019/0385050 A1 | 12/2019 | Wang et al. | |
| 2020/0026497 A1 | 1/2020 | Park et al. | |
| 2020/0117988 A1 | 4/2020 | Arthur et al. | |
| 2020/0150958 A1 | 5/2020 | Ahmed | |
| 2020/0159809 A1 | 5/2020 | Catthoor et al. | |
| 2020/0192701 A1 | 6/2020 | Horowitz et al. | |
| 2020/0201576 A1 | 6/2020 | Yudanov et al. | |
| 2020/0226473 A1 | 7/2020 | Sharma et al. | |
| 2020/0302298 A1 | 9/2020 | Van et al. | |
| 2020/0349106 A1 | 11/2020 | Ovsiannikov | |
| 2021/0019591 A1 | 1/2021 | Venkatesh et al. | |
| 2021/0042087 A1* | 2/2021 | Pugh | G06F 13/4027 |
| 2021/0064985 A1 | 3/2021 | Sun et al. | |
| 2021/0089316 A1* | 3/2021 | Rash | G06N 3/04 |
| 2021/0091794 A1* | 3/2021 | Snelgrove | H03M 13/09 |
| 2021/0157548 A1 | 5/2021 | Elmer | |
| 2022/0350775 A1 | 11/2022 | Volpe | |
| 2023/0004384 A1 | 1/2023 | Meyer et al. | |
| 2023/0004523 A1 | 1/2023 | Meyer et al. | |
| 2023/0010054 A1 | 1/2023 | Elmer | |

FOREIGN PATENT DOCUMENTS

| | | |
|---|---|---|
| WO | 2021/108644 A1 | 6/2021 |
| WO | 2021/108660 A1 | 6/2021 |

OTHER PUBLICATIONS

Search Report and Written Opinion dated Mar. 4, 2021, Issued in PCT/US2020/062356.

Arnould, E., et al., A Systolic Array Computer., 1985, IEEE., pp. 232-235. (Year: 1985).

Bao, Wenji, et al., A Reconfigurable Macro-Pipelined Systolic Accelerator Architecture, 2011, IEEE., 6 pages. (Year: 2011).

Dick, Chris., Computing the Discrete Fourier Transform on FPGA Based Systolic Arrays, 1996, Proc of the 4th Intl. ACM Symposium on Field Programmable Gate Arrays, 7 pages. (Year: 1996).

Garland et al. "Low Complexity Multiply-Accumulate Units for Convolutional Neural Networks with Weight Sharing," ACM, 24 pages (2018).

Hu, Hen Yu., et al. Systolic Arrays, 2019, Spring inti. Publishing, pp. 939-977. (Year: 2019).

Kung "Why Systolic Architectures," IEEE pp. 37-48 (1982).

Kung et al. "Let's Design Algorithms for VLSI Systems," Dept. of Computer Science, Carnegie Mellon Univ, Pittsburgh (Jan. 1979).

Kung et al. "Packing Sparse Convolutional Neural Networks for Efficient Systolic Array Implementations: Column Combining under Joint Optimization," ACM. pp. 821-834 (2019).

Kung et al. "Systolic Arrays for VLSI," Dept. of Computer Science, Carnegie Mellon, Pittsburgh (Apr. 1978).

Liu, B. et al., An Energy-Efficient Systolic Pipeline Architecture for Binary Convolutional Neural Network, 2019, IEEE, 4 pages. (Year: 2019).

Pedram , A. et al. A High performance, Low Power Linear Algebra Core, 2011, IEEE, pp. 35-42 (Year: 2011).

Wah, B, W. et al. Systolic Programming for Dynamic Programming Problems, 1999, Circuits Systems Signal Processing vol. 7, No. 2, pp. 119-149. (Year:1999).

Yang, Z. et al., "Systolic Array Based Accelerator and Algorithm Mapping for Deep Learning Algorithms", Network and Parallel Computing, 2018, pp. 153-158.

\* cited by examiner

SYSTOLIC ARRAY COMPONENT COMBINING MULTIPLE INTEGER AND FLOATING-POINT DATA TYPES

BACKGROUND

Artificial neural networks are computing systems with an architecture based on biological neural networks. A neural network may be implemented by circuitries and data paths, such as a systolic array. Systolic arrays can accelerate the performance of the training and inference phases of artificial neural networks. During the training phase, input data can be provided to train a model. During the inference phase, new inputs can be processed according to the model to obtain a predicted result. User applications often use the model in the inference phase, so the inference phase can often have time sensitivities, and latency during the inference phase can negatively impact the user experience.

As more applications use artificial neural networks, the applications also use a wide range of input data types and input data ranges. Increasing data type compatibility and data range compatibility can often result in increases to the complexity, size, and cost of processing elements in the systolic array. These increases can also affect the system processing speed and the system power consumption. Power consumption and size of the systolic array can become important considerations when a systolic array is required to support multiple data types.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
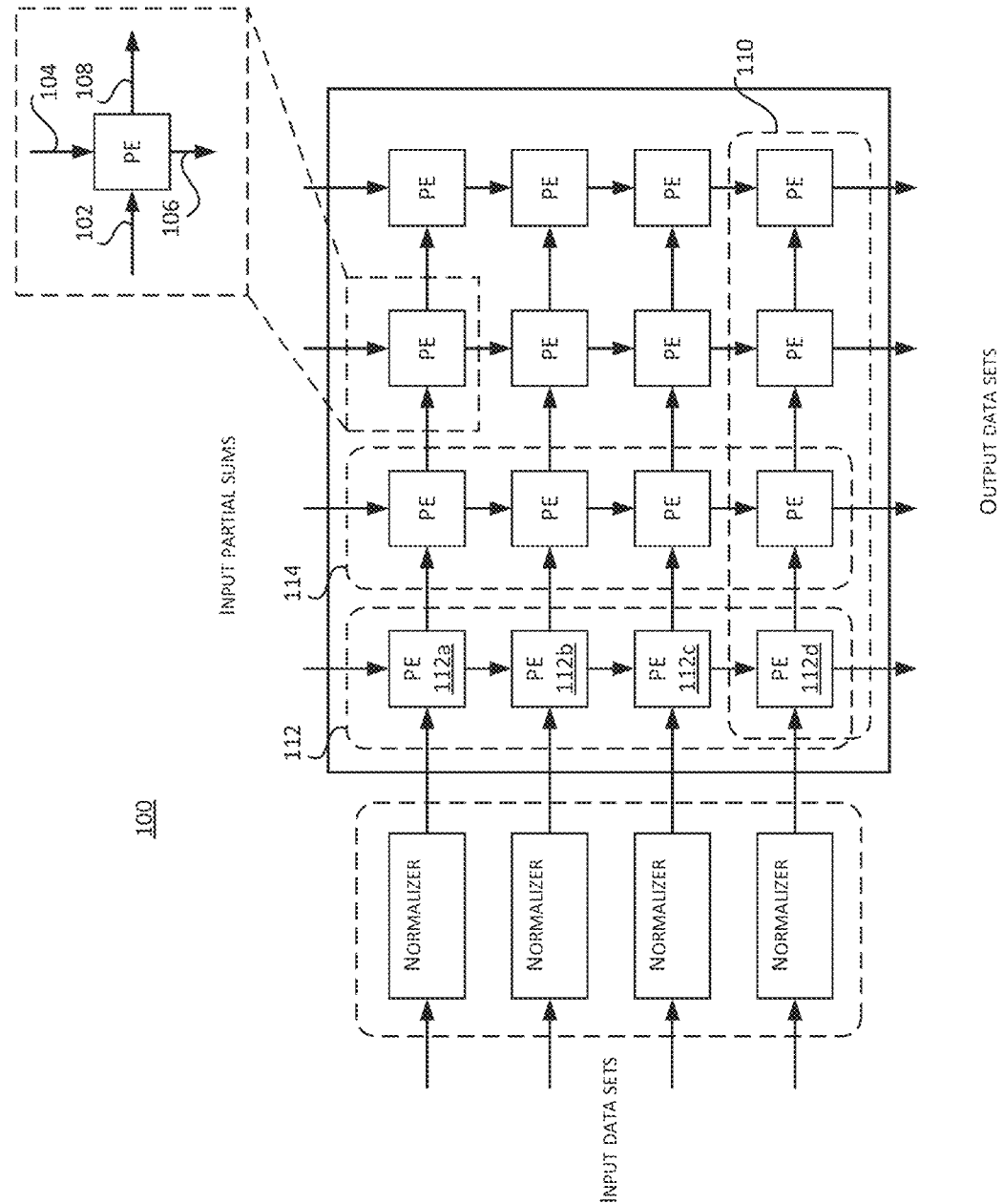
FIG. 1 illustrates an example 4×4 systolic array.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

A convolutional neural network (CNN) is generally a feed-forward artificial neural network, which may include multiple intermediate layers and an output from one layer may be used as an input to the next layer. Systolic arrays may be used to accelerate the workload in neural networks by reading the data from the memory once, and reusing it in multiple computations. A systolic array may be implemented using a two-dimensional array of processing elements (PEs).

Generally, an input data set (e.g., an input feature map) may be fed, one input data element at a time, into its respective row of the systolic array, and passed from one PE to another PE in a given row starting from a leftmost PE. As machine learning applications and neural network applications proliferate, the variety of values and data types for the input data set similarly proliferate. Some applications use higher precision floating-point 32-bit (FP32) or floating-point 64-bit (FP64) data type inputs. Some applications use floating-point 16-bit (FP16), brain float point 16 bit (bfloat16 or BF16), or 16-bit integer, or 8-bit integer data type inputs.

Providing support for longer inputs, such as 64-bit or 32-bit inputs, results in greater amounts of memory, greater communication bandwidth throughout each PE and between components, greater circuit complexity, greater latency, and greater cost in comparison to supporting shorter data types, such as 16-bit or 8 bit inputs. In a systolic array of hundreds or thousands of PE's, the added support for longer data types can cause a multiplied increase in the cost, memory size, communication bandwidth, circuit complexity, and latency.

In accordance with embodiments of the present disclosure, many machine learning applications and neural network applications designed or programmed to use longer data types can achieve improved performance speeds and execute on lower cost, simpler hardware that supports shorter data types while sacrificing little or no accuracy in final results such as final inference predictions. This counter-intuitive result can occur because the simpler hardware can run faster, use less memory, use less bandwidth, use simpler circuits, and use silicon area more cost effectively, and because many applications are insensitive to intermediate precision.

Specifically, as disclosed herein, longer data type inputs can be executed on hardware supporting shorter data types by quantizing the longer data types into the shorter data types. For many machine learning applications and neural network applications, the loss of excessive intermediate precision due to quantization can have little or no impact on a final result. Accordingly, simpler hardware can be used to improve execution of programs written by programmers and designers who use excessively precise data types.

Due to the variety of data types used in machine learning applications and neural network applications, including for example, 16 bit integers, 8 bit integers, FP16, and bfloat16 data types, it is desirable to support a variety of these data types. It can be further desirable to support a variety of these data types when the input data is quantized.

When training models or making inferences, the input values can vary across a wide range. In some applications, input values substantially center around zero. In other applications, input values center around an offset from zero. In many applications, the input data is not symmetrically distributed about zero, and so an asymmetric sampling scheme can be applied to more accurately reflect the distribution of input data. After asymmetric sampling, an original value of zero can be quantized into a value or range that is represented as a nonzero binary value.

Processing elements in a systolic array can be modified to perform arithmetic on asymmetrically quantized numbers. However, such modifications can substantially increase the complexity of the PE's. For example, special circuitry can handle multiplication of one or more zero inputs to generate zero as the output. If the zero value is shifted according to an asymmetric quantization scheme, then adding such special circuitry can increase the complexity of each PE and add substantial costs.

As an alternative solution, to support the processing of asymmetrically quantized data, the data can be first partially de-quantized by shifting the data so that zero is represented as a binary zero, and arithmetic circuits can do so by increasing a bit representation of numbers by one bit to preserve the quantized accuracy. For example, to process a quantized 8-bit integer, a systolic array can partially de-quantize the 8-bit integer into a 9-bit integer by shifting the 8-bit integer into a symmetric 9-bit form. This partial de-quantization simplifies arithmetic logic circuits, such as a multiplier, that receive the inputs because the multiplier can avoid including complicated circuitry to support quantized, shifted zeros that are not represented as zero's, the multiplier can also avoid supporting asymmetric representations of positive and negative numbers.

A de-quantizer can provide the 9-bit integer to a plurality of PE's to avoid including de-quantizing circuitry in each individual PE. Nine bits of integer can accurately represent a quantized, 8-bit integer that is shifted into a symmetrical representation. Various example systems can include a partial de-quantizer configured to shift a quantized number into a symmetrical representation of a slightly longer and sufficiently lossless length and provide the partially de-quantized number to a plurality of PE's without mapping into the next larger standard data type (e.g., without mapping 8 bit into 16 bit representations, without mapping 16 bit into 32 bit representations).

The PE's in the systolic array disclosed herein can perform more efficient operations and support a wide range of data types and data values. The PE's may perform either integer operations, floating-point operations, other types of non-integer operations, or any combination thereof. For example, a PE can include a 16-bit arithmetic data path that performs a multiply accumulate operation. The example 16-bit arithmetic data path can have multipliers and adders that support all or any combination of the data types: 8-bit integers, 9-bit integers, FP16, and BF16.

To perform operations on both floating-point inputs and integer inputs, two or more separate circuits can be implemented with each separate circuit operating on one specific data type. For example, a first multiplier can operate on integer data types, and a second multiplier can operate on floating-point data types. As another example, a first adder can operate on integer data types, and a second multiplier can operate on floating-point data types.

In examples disclosed herein, such as discussed with respect to FIG. 2A, FIG. 2B, FIG. 2C, FIG. 2D, FIG. 10A, FIG. 10B, FIG. 10C, and FIG. 10D, a systolic array may have PE's that include shared circuitry that operates on two or more data types. For example, a PE can operate on integer inputs using first circuitry that includes components also used for operating on floating-point inputs. As a more specific example, a PE can include a shared multiplier that can operate on both integer and floating-point data types, where the shared multiplier has certain subcomponents that are used to process both integer data types and floating-point data types.

By reusing the shared subcomponents, examples of the disclosed technologies reduce dynamic power consumption in a systolic array and reduce both the size and number of circuits required to support both integer and non-integer operations. Additionally, examples of the disclosed technologies can include systems and methods to enable a systolic array to accept both integer and non-integer data, reducing the need for specialized circuitry for each data type. Individual PE's in the systolic array can perform mathematical operations on both integers and non-integers. In some examples, the PE's include shared arithmetic circuitry that performs at least part of an integer arithmetic operation and is reused to perform at least part of a non-integer arithmetic operation. The shared arithmetic circuitry enables the systolic array to reduce power consumption and size in comparison to systems with separate arithmetic circuits for different data types.

In some examples, such as further described with respect to FIG. 2A, FIG. 2B, FIG. 2C, and FIG. 2D, the PE may contain an arithmetic circuit, such as a multiplier and/or adder, configured to perform both integer and non-integer operations. As further described with respect to FIG. 10A, FIG. 10B, FIG. 10C, and FIG. 10D, the PE in a systolic array may contain a first sub-circuit configured to perform one or more integer operations and at least part of one or more non-integer operations. The PE's in the systolic array may also contain a second sub-circuit that is capable of completing the other part of the non-integer operations.

The systolic array may receive a data type control signal indicating a selected data type. For example, the data type control signal can select between integer and non-integer data types, such as 8 bit integer, 9 bit integer, FP16, and bfloat16. In some examples, the systolic array can generate the selected data type based on the input to the systolic array, such as the input data element, input partial sum, weight, or opcode. In some examples, the selected data type is received as a separate input signal. The control signal indicating the selected data type can be provided to PE's to instruct the PE's to perform operations on the selected data type and/or select an output having the selected data type.

In some examples, arithmetic operations can be performed on the selected data type while skipping performance of arithmetic operations on an unselected data type, such as skipping a non-integer operation when the selected data type is an integer. For example, the systolic array can perform a multiply-accumulate operation on integer inputs when the selected data type is an integer data type, and then the systolic array can perform the multiply-accumulate operation on floating-point inputs (or other data type) when the selected data changes to the floating-point data type (or other data type). In other examples, the PE's perform both the integer operation and the non-integer operation without regard to the selected data type, and a result formatted in the selected data type is selected from among the output of the multiplication operation and the output of the accumulate operation based on the data type control signal.

PE's in the systolic array may perform multiple arithmetic operations including but not limited to addition and multiplication. Each of these operations may utilize shared circuitry or separate circuitry. Each PE in the systolic array may utilize any combination of shared or separate circuitry in performing addition, multiplication, or any other operation. For example, a PE may utilize a shared multiplier and separate adders, a PE may utilize separate multipliers and a shared adder, or a PE may utilize any combination of a shared/separate multiplier(s) with shared/separate adder(s). The shared circuitry implements at least part of one operation on a first data type and at least a part of a second operation on a second data type. For example, a shared circuitry may be a shared multiplier for fully performing integer multiplication and for performing at least a part of floating-point multiplication. As a different example, separate circuitry can include a first integer adder and a second floating-point adder that is physically separate from the first integer adder.

The systolic array may include multiple delay registers to pipeline different segments within PE's. Each of these delay registers may receive an input and delay outputting the input for at least one clock cycle. For example, a delay register may be placed between a shared multiplier and one or more adders so that the multiplication and addition can be performed in parallel, and so that the combined delay of multiplication and addition do not limit the clock speed. The shared multiplier may be configured to produce one or more multiplier products to store in one or more delay registers to be operated on by one or more adders in a subsequent clock cycle.

PE's in the systolic array may skip certain operations under certain conditions. For example, the multiplication operation can be skipped when a zero is detected on an input data element for a current operation, when a zero is stored as a weight, or a no-operation (NOP) is received by a PE. The operation of other circuitry such as registers, multiplexors, and the like can additionally or alternatively be skipped under same or similar conditions.

FIG. 1 illustrates an example 4×4 systolic array 100. For example, the systolic array 100 may include four PEs in each row, and four PEs in each column. It will be understood that the systolic array 100 may include any number of PEs in each row and column. The systolic array 100 may be part of a neural network processor in a computer system. For example, the computer system may be configured to provide multi-tenant compute services for data processing applications such as an image recognition service, text-based data processing (e.g., processing of search queries), audio or video data processing, etc.

Each PE may include a row input bus 102, a column input bus 104, a column output bus 106, and a row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs, and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100 may be configured to perform the arithmetic computations, including multiplication and addition operations, for the processing elements of a neural network. For example, each PE may include arithmetic units such as a multiplier and an adder, a fused multiplier adder, a pipelined multiplier and adder, or any combination thereof. In the example of FIG. 1, each row of the PEs may be configured to handle one set of input data, and each column of the PEs may generate one set of output data based on the sets of input data received by each PE in a given column.

In some implementations, a column 112 of the PEs (the leftmost column) may receive four sets of input data, with each set of input data being handled by one row (e.g., row 110) of the PEs. Each PE in the column 112 may obtain, from the corresponding input data set received via the row input bus 102, an input data element and an associated weight value, and multiply the input data element with the weight value to generate a scaled input. The scaled inputs generated by the PEs within any column (including the column 112) can be accumulated by the one or more adders of each PE. For example, a PE 112a (of the column 112) may generate one or more first scaled inputs (from the first input data set). The one or more adders may generate one or more sums to be selected as the output partial sum. The PE 112a may be configured to transmit the output partial sum to a PE 112b via the column output bus 106. The PE 112b may also generate a second scaled input (from the second input data set) and add the second scaled input to the partial sum. The updated partial sum is then transmitted to a PE 112c via the column output bus 106. The partial sums are updated and propagated across the column 112, and a PE 112d may generate a sum of the scaled inputs from the four input data sets.

The sum generated by the PE 112d may correspond to an output data set, and may be fed back to the leftmost PEs after going through an activation function.

Each PE in the column 112 can also propagate the input data sets to other PE columns (e.g., a column 114), which can scale the input data sets with a different set of weights from the column 112. Each column of the PEs can perform the arithmetic operations (such as multiplications and additions) to generate the output data elements for other processing elements in parallel. In the example of FIG. 1, the systolic array 100 can generate output data elements for four PEs corresponding to the four columns of the systolic array 100.

The systolic array 100 may perform convolution computations in multiple waves. A wave may be defined as streaming of input data elements while reusing the same weights in the systolic array 100. For example, the respective weights may have been pre-loaded in each PE in the systolic array 100, sequentially or in parallel prior to starting a wave computation. The partial sums generated by the PEs may correspond to a single wave. As the PEs of the systolic array 100 perform arithmetic operations for the convolution computations, dynamic power dissipated by all the multipliers in the PEs may be significant. This problem may be further exacerbated for a systolic array comprising a large number of PEs (e.g., several thousands). Examples of arithmetic operations performed by a PE are further discussed with reference to FIG. 2A, FIG. 2B, FIG. 2C, and FIG. 2D.

Figure 2A:
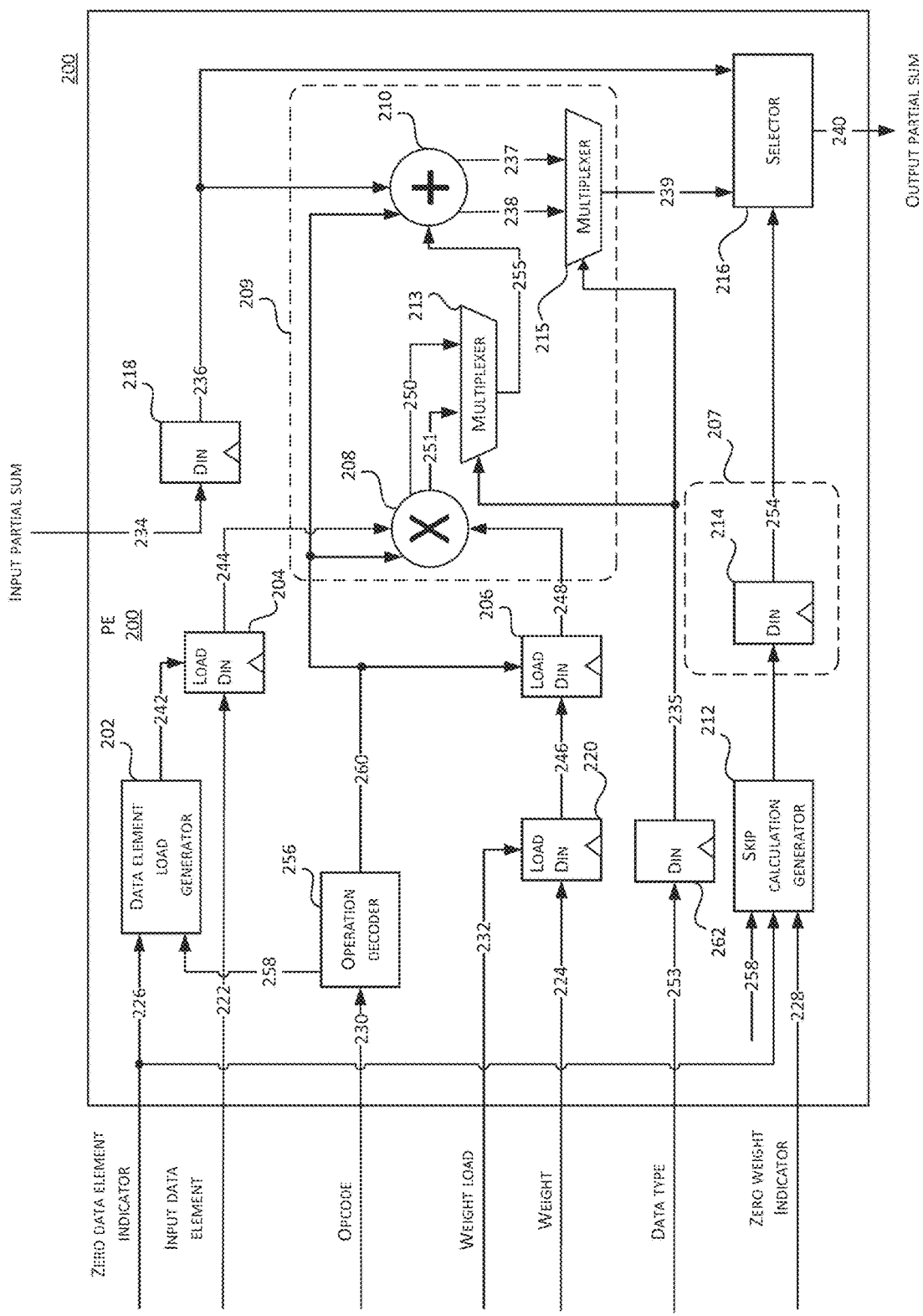
FIG. 2A illustrates a processing element for neural network computations including a shared multiplier and a shared adder, according to certain examples of the disclosed technologies.
Figure 10A:
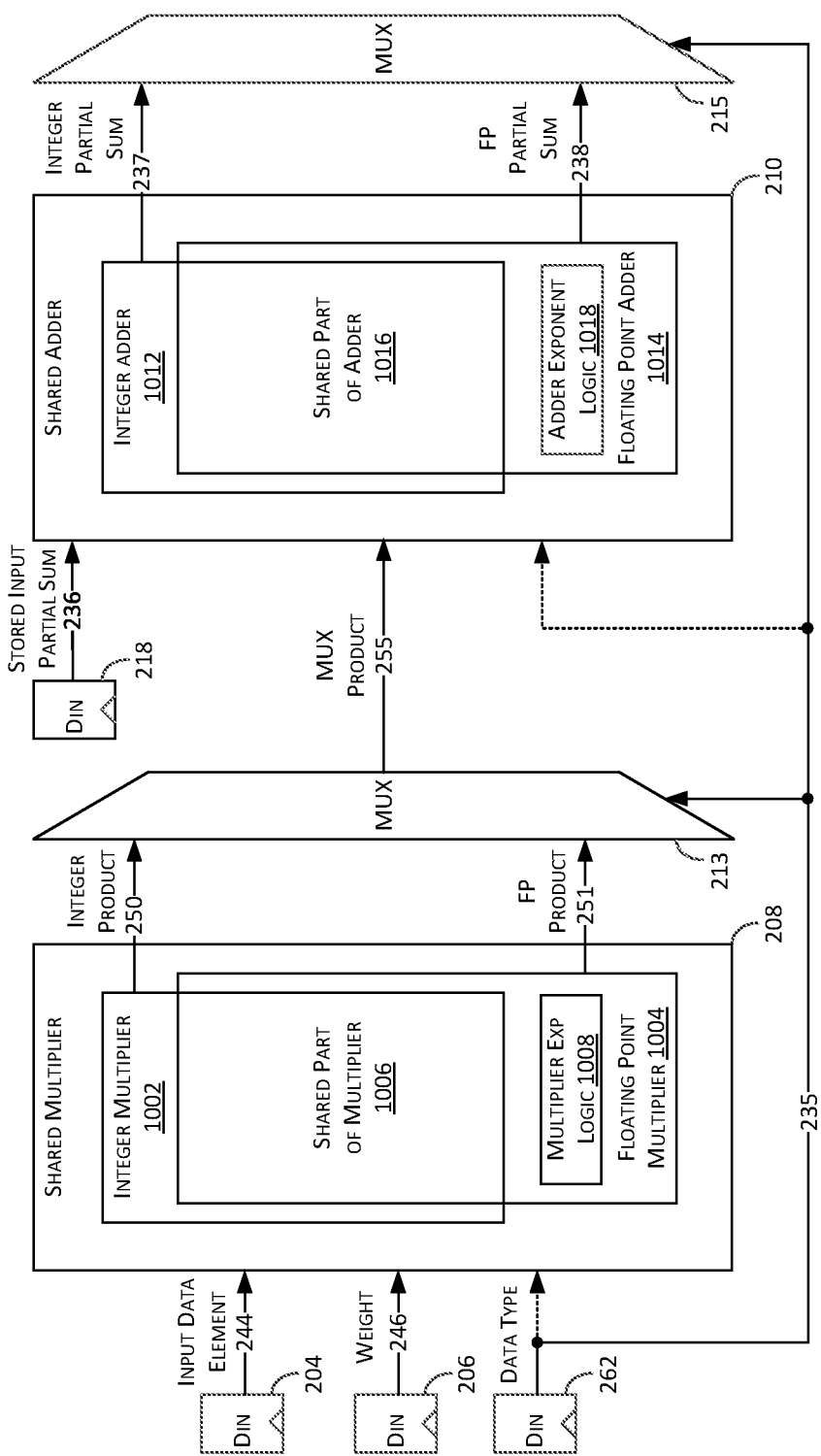
FIG. 10A illustrates an example of additional details of the multiply accumulate datapath of FIG. 2A.

FIG. 2A illustrates a PE 200 for neural network computations, according to certain examples of the disclosed technologies. FIG. 10A shows additional details of the multiply accumulate datapath of FIG. 2A. The PE 200 may be part of a systolic array similar to the systolic array 100 in FIG. 1. Some examples may be described with reference to neural networks, however, it will be understood that certain examples may be used in other applications, e.g. pattern recognition, image processing, audio processing, video processing, etc., without deviating from the scope of the technologies.

With respect to FIG. 2A and FIG. 10A, the PE 200 may include a data element load generator 202, an input data element register 204, a weight register 206, a shared multiplier 208, a shared adder 210, a skip calculation generator 212, a first multiplexer 213, a skip calculation register 214, a second multiplexer 215, a selector circuit 216, an input partial sum register 218, a cached weight register 220, an operation decoder 256, and a data type register 262. The multiplier 208, products 250 and 251, multiplexer 213, first multiplexer product 255, shared adder 210, sums 237 and 238, and multiplexer 215 form an example multiply accumulate datapath 209. The register 214 is part of a skip calculation storage datapath 207 between the skip calculation generator 212 and the selector 216. The PE 200 may be configured to receive an input data element 222, a weight 224, a zero data element indicator 226, a zero weight indicator 228, an opcode 230, a weight load 232, an input partial sum 234, and a data type input signal 253 to perform the convolution computations according to some examples.

The PE 200 may be configured to receive the input data element 222 via a first port. The input data element 222 may correspond to an input data set, or any array of input data elements. The PE 200 may receive one input data element at a time, in uniform time periods or systolic intervals, from the input dataset. For example, a systolic interval may correspond to a clock cycle. The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may correspond to an intermediate output dataset, which has gone through an activation function, e.g., ReLu or Sigmoid, as discussed with reference to FIG. 1. Each input data element 222 may be formatted as an integer data type, floating-point data type, or any suitable data type. Each input data element 222 may arrive on a bus wide enough to accommodate the largest supported data type while setting the suitable number of bits for each data type (e.g., 8 or 9 bits for integers, 16 bits for FP16 or BF16). The input data element may be stored in the input data element register 204 for a period of time.

The PE 200 may be configured to receive the weight 224 via a second port. In some implementations, the weight 224 may belong to a set of weight values corresponding to a convolution filter. The weight 224 may be pre-loaded in the PE 200 prior to receiving the input data element 222. In some examples, the PE 200 may receive one weight value at a time, in uniform time periods, from the set of weight values, to pre-load each PE in a given row with a respective weight value. The PE may pass the weight value to the next PE in the respective row until each PE in the given row has been pre-loaded. Each PE may cache the respective weight value to use for computations with the input data elements. Each weight 224 may be integer data type, floating-point data type, or any suitable data type. Each weight 224 may include 8-bits, 9-bits, 16-bits, or any suitable number of bits. The weight may be stored in a cached weight register 220 for a period of time.

The PE 200 may be configured to receive the input partial sum 234 for a current operation via a third port. The input partial sum can be stored in register 218 and used in an addition operation by the adder 210.

The PE 200 may be configured to receive the zero data element indicator 226 for a current operation via a fourth port. The zero data element indicator 226 may include a single bit or multiple bits. The zero data element indicator 226 may be used to indicate whether the input data element 222 associated with the zero data element indicator 226 is zero. For example, a value of "1" for the zero data element indicator 226 may indicate that the input data element 222 associated with the zero data element indicator 226 is zero, and a value of "0" for the zero data element indicator 226 may indicate that the input data element 222 associated with the zero data element indicator 226 is not zero. A "0" may correspond to a logical zero or a logical low, and a "1" may correspond to a logical one or a logical high. For example, in some implementations, the logical zero may be represented by a first range of voltage levels (e.g., 0-2 volts), and the logical one may be represented by a second range of voltage levels (e.g., 3-5 volts). It will be understood that other implementations to represent a "0" value and a '1" value are possible without deviating from the scope of the disclosed technologies. The zero data element indicator 226 may be generated by a circuit external to the PE 200, and passed to all the PEs in the same row sequentially, in the uniform time periods.

The PE 200 may be configured to receive a data type input signal 253 via a fifth port for storing in a data type register 262 to be used as the data type control signal 235. Alternatively, the data type control signal 235 can be decoded from the opcode 230, the input data element 222, stored input data element 244, weight 224, cached weight 246, stored weight value 248, input partial sum 234, or the stored input partial sum 236. When decoding the data type control signal 235 from these sources, the register 262 may be implemented or omitted such that the data type control signal 235 correctly reflects the data type of a present operation being performed. The data type control signal 235 may indicate the data type of one or more of the weight 224, the input data element 222, and the input partial sum 234. The PE 200 may provide the data type control signal 235 to the first multiplexer 213 and to the second multiplexer 215 to control the selections of the first multiplexer 213 and the second multiplexer 215.

The PE 200 may be configured to receive the zero weight indicator 228 via a sixth port. The zero weight indicator 228 may include a single bit or multiple bits. The zero weight indicator 228 may be used to indicate whether the weight 224 associated with the zero weight indicator 228 is zero. For example, a value of "1" for the zero weight indicator 228 may indicate that the weight 224 is zero, and a value of "0" for the zero weight indicator 228 may indicate that the weight 224 is not zero. The zero weight indicator 228 may be generated by a circuit external to the PE 200, and passed to all the PEs in the same row sequentially along with the weight 224.

The weight load signal 232 may be used to load the weight 224 into the cached weight register 220 to provide a cached weight 246. The weight load signal 232 may be asserted to cache the weight 224 for the PE 200 in the cached weight register 220 before the input data element 222 is fed into the array. As the weights are shifted into the array to pre-load each PE with a respective weight value, the weight load 232 may be asserted for each PE at certain time periods in order to pre-load each PE with the appropriate weight value.

The operation decoder 256 may be configured to decode the opcode 230 to determine an operation to be executed by the PE 200 for different instructions represented by different opcode values. In some examples, a first opcode value may correspond to an instruction to shift the weights from one PE to another in the systolic array. A second opcode value may correspond to an instruction to start the arithmetic computations by the PE. For example, once the weights have been pre-loaded in the systolic arrays, the input data elements may be read from the memory and the arithmetic computations may be performed as the input data elements pass through the array. The second opcode or a separate opcode can also include a selected data type that can be decoded to generate the data type control signal 235. A third opcode value may correspond to an instruction to execute NOPs. The NOPS may be used to space two systolic array instructions, or when there are no input data elements to be read from the memory. For example, the NOPs may be used to space the instructions to shift the weights, and the instructions to start the arithmetic computations. For example, for a 4×4 array, it may take up to 15 cycles to shift the weights into all the PEs in the array before starting the arithmetic computations so 15 NOP cycles may be needed.

The operation decoder 256 may be configured to decode the opcode 230 to generate a NOP 258 and the start computations signal 260. The operation decoder 256 may be configured to provide the start computations signal 260 to the weight register 206 that is connected to the shared multiplier 208 and to the shared adder 210. The operation decoder 256 may also be configured to provide the start computations signal 260 to the shared multiplier 208. The opcode 230 may include any suitable number of bits, e.g., two, four, etc. In some implementations, instead of receiving the data type signal 253, each PE can include an operation decoder 256 configured to decode the opcode 230 to generate the data type control signal 235 for providing to components in the multiply accumulate datapath 209.

In some implementations, the input data element 222, the weight 224, the opcode 230, the zero data element indicator 226, the zero weight indicator 228, and the data type input signal 253 may belong to the row input bus 102, as discussed with reference to FIG. 1. In some implementations, a splitter (not shown) may be used in the PE 200 to split the row input bus 102 into different internal buses to carry the input data element 222, the weight 224, the opcode 230, the zero data element indicator 226, the zero weight indicator 228, and the data type input signal 253 within the PE 200.

The data element load generator 202 may be configured to generate a data load signal 242 that may be used to allow the input data element register 204 to skip storing of the input data element 222 in certain conditions. In some examples, the input data element 222 may be loaded into the input data element register 204 when the data load signal 242 is asserted based on the zero data element indicator 226 and the NOP 258. The data load signal 242 may be asserted when the zero data element indicator 226 corresponding to the input data element 222 is "0" and the opcode 230 does not indicate a NOP (e.g., the NOP 258 is "0"). The data load signal 242 may be de-asserted when the zero data element indicator 226 corresponding to the input data element 222 or the NOP 258 is "1." The data element load generator 202 may be implemented using an OR, NOR, NAND, or any suitable circuit.

The input data element register 204 may be configured to store the input data element 222, or skip storing of the input data element 222 to provide a stored input data element 244 based on the data load signal 242 for a current operation. In some implementations, the input data element register 204 may store a Din input if a load input is "1", and may hold the previous value if the load input is "0." For example, if the data load signal 242 is "1", the input data element register 204 may store a new value for the input data element 222, and if the data load signal 242 is "0", the input data element register 204 may skip storing the new value for the input data element 222. Thus, in some instances, the input data element register 204 may only store non-zero value of the input data element 222. According to certain examples, skipping the storing of the new value by the input data element register 204 may result in not toggling the stored input data element 244 and holding the previous value of the stored input data element 244.

The weight register 206 may be configured to store the cached weight 246 to provide a stored weight value 248 based on the start computations signal 260. In some implementations, the weight register 206 may store a Din input if a load input is "1", and may hold the previous value if the load input is "0." For example, if the start computations signal 260 is asserted (e.g., the start computations signal 260 is "1"), the cached weight 246 may be loaded into the weight register 206, or else the weight register 206 may hold the previous value. Thus, the weight 224 previously loaded into the cached weight register 220 using the weight load 232 may be shifted into the weight register 206 at the start of the arithmetic computations. In some examples, the stored weight value 248, once loaded at the start of the arithmetic computations, remains unchanged as the input data element is fed into the PE 200, one element at a time, for computations corresponding to one or more waves through the systolic array.

The shared multiplier 208 may be configured to perform a multiplication operation between the stored input data element 244 and the stored weight value 248. The shared multiplier 208 may alternatively be configured to perform two or more multiplication operations between the stored input data element 244 and the stored weight value 248. The shared multiplier 208 may be configured to generate at least a first product 250 and a second product 251 based at least in part on the two or more multiplication operations. In some implementations, the first product 250 may be an integer product of 8, 9, or 16 bits, and the second product 251 may be a floating-point product of 16 bits. In various implementations, the shared multiplier 208 may be configured to generate two or more products of 8-bits, 9-bits, 16-bits, 32-bits, or any other number of bits.

As shown in FIG. 2A and shown with additional detail in FIG. 10A, the shared multiplier 208 includes an integer multiplier sub-circuit 1002 and a floating-point multiplier sub-circuit 1004 that share a shared part 1006. The floating-point multiplier sub-circuit 1004 includes multiplier exponent logic 1008.

The integer multiplier sub-circuit 1002 is configured to multiply an integer input data element 244 by an integer weight 246 to produce the integer product 250. The integer multiplication can include calculating and adding partial products to determine the integer product 250. Non-shared parts of integer multiplier sub-circuit 1002 can be selectively disabled while the data type control signal 235 indicates that a non-integer data type is selected. In various implementations, the integer product 250 can be an 8-bit integer product, a 9-bit integer product, a 16-bit integer product, or any other type of integer product, signed or unsigned. In some implementations, the integer multiplier sub-circuit 1002 can perform parallel multiplications on shorter integers, such as performing two parallel signed 9-bit integer multiplications. The multiplication can be performed using a variety of logical multiplication techniques.

The floating-point multiplier sub-circuit 1004 is configured to multiply a floating-point input data element 244 by a floating-point weight 246 to produce the floating-point product 251. The floating-point multiplication can include calculating and adding partial products to determine the significand of the floating-point product 251. In various implementations, the floating-point product 251 can have an FP16 or BF16 data type, signed or unsigned. In various implementations, the floating-point multiplier sub-circuit 1004 can process other types of non-integer data types. The floating-point multiplication can also include multiplier exponent logic 1008 for computing an exponent of the floating-point product. At least part of the floating-point multiplier sub-circuit 1004, such as multiplier exponent logic 1008, may be separate from the integer multiplier sub-circuit 1002 because integer data types do not include exponent bits. Non-shared parts of floating-point multiplier sub-circuit 1004 can be selectively disabled while the data type control signal 235 indicates that an integer data type is selected.

The shared part 1006 of the multiplier contributes to at least both the floating-point multiplication and the integer multiplication. Thus, instead of having multiple, separate multipliers with each multiplier configured to support a different data type, the shared multiplier 208 may be configured to support multiple data types including integers and non-integers. For example, the shared part 1006 can contribute to both integer multiplication and to floating-point multiplication by calculating and adding partial products, which can be performed identically or similarly for integers and significands of floating-point numbers.

As another example, the shared part 1006 can include an adder that adds partial products when performing integer multiplication and also adds exponents when performing floating-point multiplication. In another example, the first sub-circuit of the shared multiplier 208 may be configured to conduct integer multiplication and at least a portion of floating-point multiplication. In some examples, the shared part 1006 can perform all or part of the functions of the integer multiplier sub-circuit 1002.

The multiplier exponent logic 1008 can be configured to calculate an exponent value for the exponent field of a floating-point product 251. For example, the multiplier exponent logic 1008 can be configured to add or subtract exponents from an input data element 244 and the weight 246 when the data type 235 indicates a floating-point data type.

In various implementations, the shared part 1006 of the multiplier can perform two, three, any combination, or all of: a single 17-bit integer multiplication, two or more parallel 9-bit integer multiplications, a single BF16 multiplication, and a single FP16 multiplication. In some implementations, the shared multiplier 208 may be configured to perform one or more multiplication operations on at least two, three, any combination, or all of: 8-bit data types, 9-bit data types, 16-bit data types, 32-bit data types, or other data types.

The shared multiplier 208 may provide the first multiplexer 213 with at least the first product 250 and the second product 251. The first multiplexer 213 may be configured to select between at least the first product 250 and the second product 251 based at least in part on the data type control signal 235 to provide a multiplexer product 255.

The data type control signal 235 indicates a data type of the input data element 244 and a data type of the stored weight value 248 being provided to the shared multiplier 208. In some examples, such as illustrated in FIG. 2A, the data type input signal 253 is received by the PE through a port, cached in a register 262, and read from the register 262 as the data type control signal 235. In other examples, the PE may be configured to detect the data type based on one or more of the input data element 244, the stored weight value 248, input partial sum 236, or the opcode. The data type control signal 235 can be provided to the first multiplexer 213 and the second multiplexer 215 to select an output formatted in the selected data type. The data type control signal 235 may optionally be provided to one or both of the shared multiplier 208 and the shared adder 210 to disable circuitry specific to calculating a non-selected data type, thereby reducing power consumption. For example, the non-shared multiplier exponent logic in the floating-point multiplier sub-circuit 1004 may be deactivated when the data type control signal 235 indicates an integer data type. As another example, the non-shared adder exponent logic in the floating-point adder sub-circuit 1014 may also be deactivated when the data type control signal 235 indicates an integer data type. In some implementations, the shared multiplier 208 may be configured to output either the first product 250 or the second product 251 based at least in part on the first data type control signal 253.

As shown in FIG. 2A and shown with additional detail in FIG. 10A, a shared adder 210 includes an integer adder sub-circuit 1012 and a floating-point adder sub-circuit 1014 that share a shared part 1016. The floating-point adder sub-circuit 1014 also includes adder exponent logic 1018.

The shared adder 210 may be configured to perform addition operations on the multiplexer product 255 and the stored input partial sum 236 to provide sums 237 and 238. An integer addition operation on the multiplexer product 255 and the input partial sum 236 can generate an integer partial sum 237. A floating-point addition operation on the multiplexer product 255 and the input partial sum 236 can generate a floating-point partial sum 238. In various examples, the shared adder 210 may be configured to perform to integer addition, floating-point addition, or other non-integer addition. The shared adder 210 may be configured to share circuitry to perform addition operations on different data types. Although shared adder 210 is illustrated as a floating-point adder, shared adder can be any type of non-integer adder.

The integer adder sub-circuit 1012 is configured to add multiplexer product 255 with the stored input partial sum 236 to produce the integer partial sum 237. The integer addition can include performing binary addition to calculate the integer partial sum 237. Non-shared parts of the integer adder sub-circuit 1012 can be selectively disabled while the data type control signal 235 indicates that a non-integer data type is selected. In various implementations, the integer partial sum 237 can be an 8-bit integer product, a 9-bit integer product, a 16-bit integer product, or any other type of integer product, signed or unsigned.

In some implementations, the integer adder sub-circuit 1012 can perform parallel additions on integers, such as performing two parallel signed 18-bit integer additions. In such implementations, the shared multiplier 208 can perform two parallel 9-bit multiplications and generate two parallel 18-bit values as the first product 250. The integer adder sub-circuit 1012 can perform parallel additions on integers by adding a first portion of the multiplexer product 255 with a first portion of the input partial sum 236 and by adding a second portion of the multiplexer product 255 with a second portion of the input partial sum 236. For example, the multiplexer product 255 may consist of two parallel 18-bit values, and the input partial sum 236 may be a 50-bit integer number. The integer adder sub-circuit 1012 can perform a first addition on the first parallel 18-bit value and bits 0 through 24 of the input partial sum 236. The integer adder sub-circuit 1012 can perform a second addition on the second parallel 18-bit value and bits 25-49 of the input partial sum 236. The first addition and the second addition can be performed in parallel. In some implementations, the first addition and the second addition can be distinct and no arithmetic carry may be performed from the first portion of the input partial sum 236 to the second portion of the input partial sum 236. The first addition and the second addition can be performed using a variety of logical addition techniques.

The floating-point adder sub-circuit 1014 is configured to add multiplexer product 255 with the stored input partial sum 236 to produce the floating-point partial sum 238. The floating-point addition can include shifting the significand to align exponents and performing binary addition on the aligned significand to determine the floating-point partial sum 238. In various implementations, the floating-point partial sum 238 can have an FP16 or BF16 data type, signed or unsigned. In various implementations, the floating-point adder sub-circuit 1014 can process other types of non-integer data types. The floating-point multiplication can also include adder exponent logic 1018 for computing an exponent of the floating-point partial sum and for shifting the significands to align. At least part of the floating-point adder sub-circuit 1014, such as adder exponent logic 1018, may be separate from the integer adder sub-circuit 1012 because integer data types do not include exponent bits. Non-shared parts of floating-point adder sub-circuit 1014 can be selectively disabled while the data type control signal 235 indicates that an integer data type is selected.

The shared part 1016 of the adder contributes to at least both the floating-point addition and the integer addition. Thus, instead of having multiple, separate adders with each adder configured to support a different data type, the shared adder 210 may be configured to support multiple data types including integers and non-integers. For example, the shared part 1016 can contribute to both integer addition and to floating-point addition by performing, for example, binary addition, which can be performed identically or similarly for integers and significands of floating-point numbers.

The adder exponent logic 1018 can be configured to calculate an exponent value for the exponent field of a floating-point partial sum 238. For example, the multiplier exponent logic 1008 can be configured to add or subtract from the exponent to normalize the floating-point partial sum 238.

In various implementations, the shared part 1016 of the adder 210 may perform or contribute to two, three, any combination, or all of: a single 17-bit integer addition, two or more parallel 9-bit integer addition, a single BF16 addition, and a single FP16 addition. In some implementations, the shared part 1016 of the adder 210 may perform or contribute to all of single 17-bit integer addition, two or more parallel 9-bit integer additions, a single BF16 addition, and a single FP16 addition. In some implementations, the shared adder 210 may be configured to perform one or more addition operations on at least two of: 8-bit data types, 9-bit data types, 16-bit data types, 32-bit data types, or other data types.

The second multiplexer 215 receives the sums generated by the shared adder, including at least the integer partial sum 237 and the floating-point partial sum 238. The second multiplexer 215 selects, based on the data type control signal 235, a partial sum 239 from among the inputs including the integer partial sum 237 and the floating-point partial sum 238.

With continued reference to FIG. 2A, the selector circuit 216 may be configured to receive the partial sum 239, the input partial sum 236, and the stored skip calculation indicator 254. The selector circuit 216 may be configured to select, based on the stored skip zero weight indicator 254, either the partial sum 239 or the input partial sum 236 to provide as an output partial sum 240 via a seventh port. In some implementations, the selector 216 can be combined with the multiplexer 215 to select either the integer partial sum 237, the floating-point partial sum 238, or the stored input partial sum 236 based on the stored skip calculation indicator 254 and the data type control signal 235 to provide the output partial sum 240 via the seventh port. According to some embodiments, when a value of either the input data element 222 or the weight 224 for a current operation is zero, or the NOP 258 is asserted, the floating-point partial sum 238 or the integer partial sum 237 may not provide a correct result for the current operation since the integer product 250 and the floating-point product 251 may hold a value for the previous operation. In such cases, the stored skip calculation indicator 254 may bypass the floating-point partial sum 238 and the integer partial sum 237 and select the stored input partial sum 236 to provide the output partial sum 240. For example, when the stored skip calculation indicator 254 provides a skip calculation signal of "1", the input partial sum 236 may be selected as the output partial sum 240 by the selector circuit 216 for a systolic cycle, and when the stored skip calculation indicator 254 provides a skip calculation signal of "0", either the integer partial sum 237 or the floating-point partial sum 238 may be selected by the selector circuit 216 as the output partial sum 240 for the systolic cycle.

Further, in such cases, the stored skip calculation indicator 254 may prevent one or both of the shared multiplier 208 or the shared adder 210 from contributing to the arithmetic computations of the systolic array. For example, the stored skip calculation indicator 254 can be used to keep the inputs to the shared multiplier 208 or the shared adder 210 from changing, thereby improving power efficiency by preventing further computation.

Figure 2B:
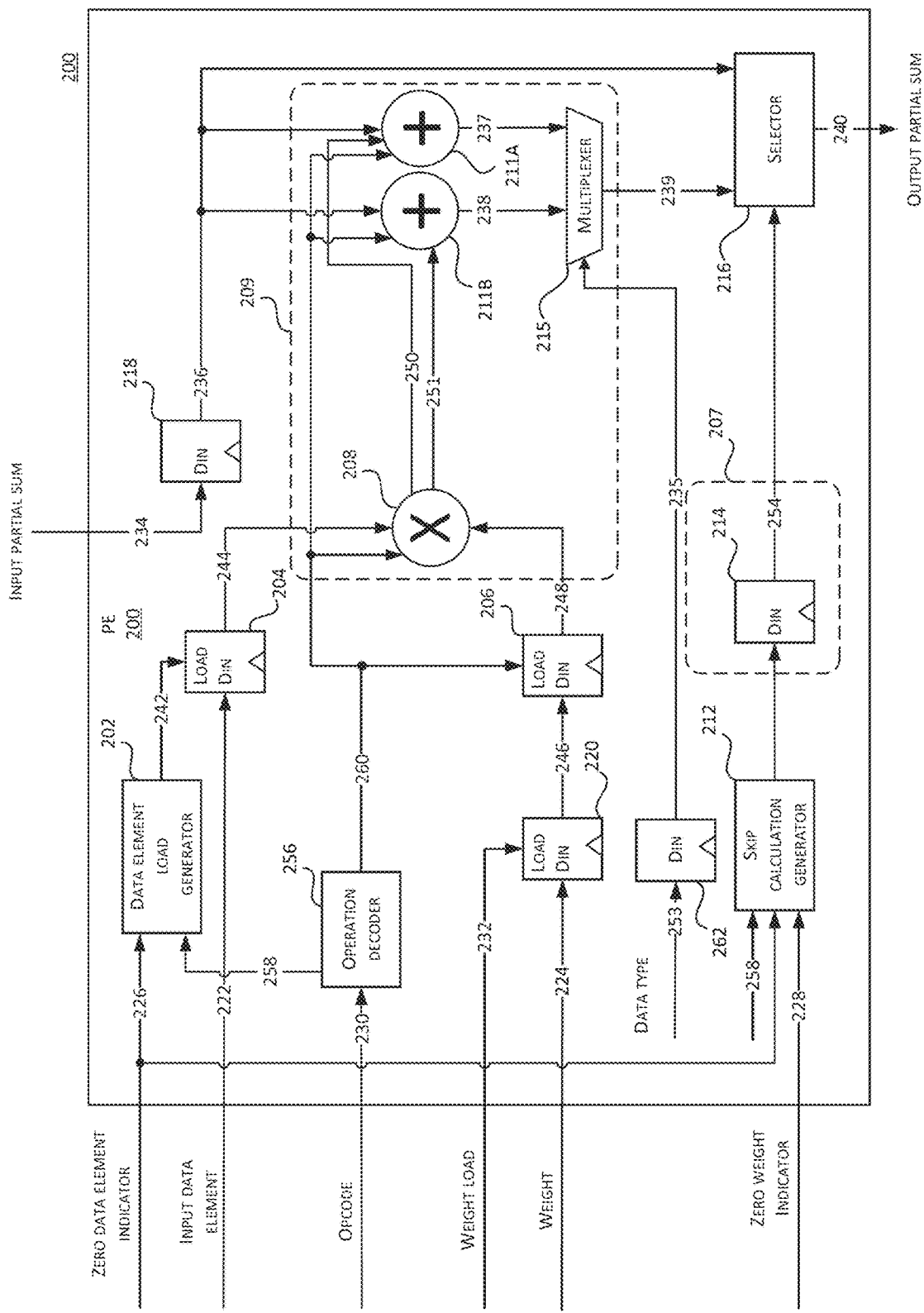
FIG. 2B illustrates a processing element for neural network computations including a shared multiplier and separate adders, according to certain examples of the disclosed technologies.
Figure 10B:
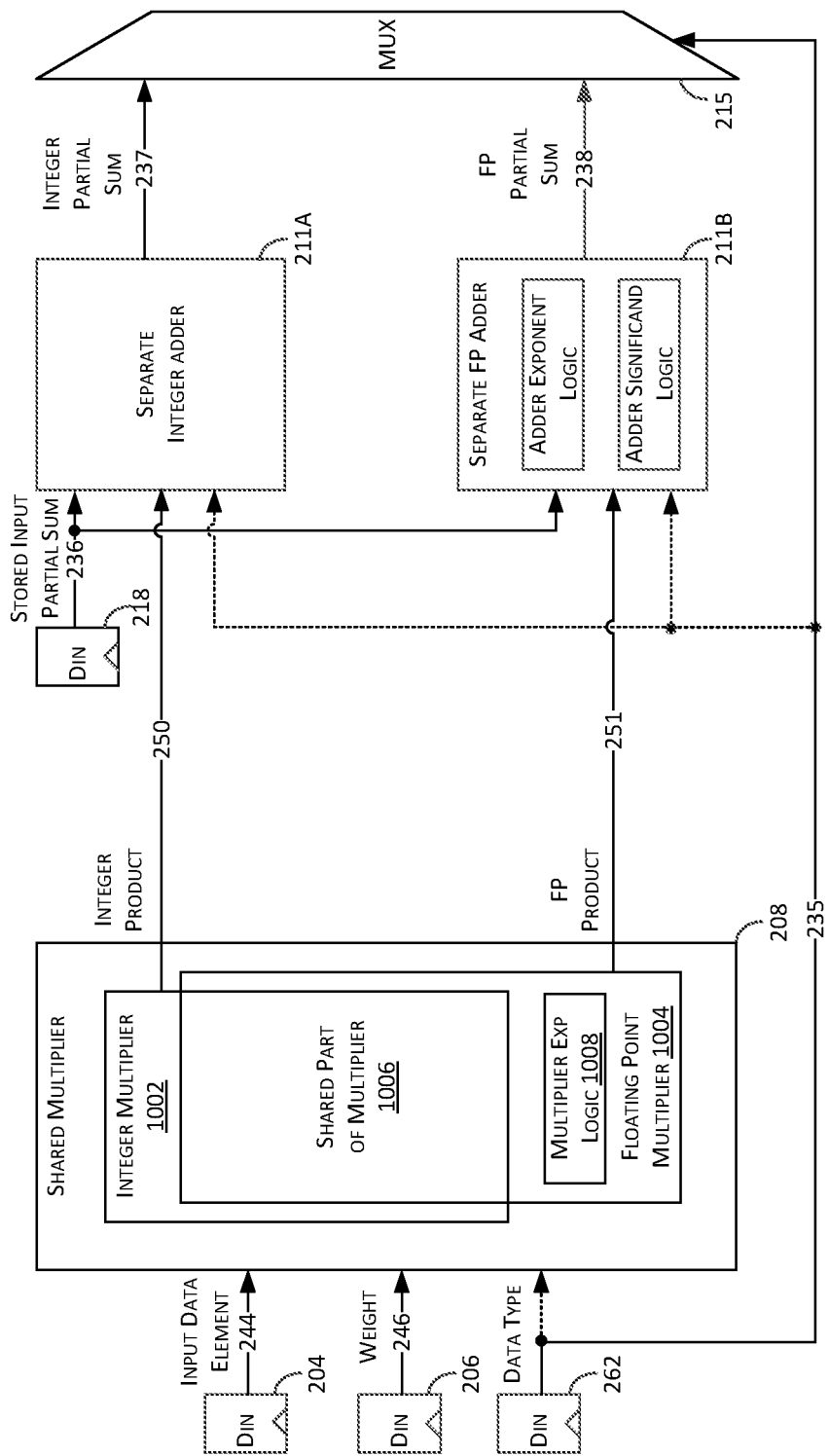
FIG. 10B illustrates an example of additional details of the multiply accumulate datapath of FIG. 2B.

FIG. 2B illustrates an example PE similar to the example PE shown in FIG. 2A, except that: in FIG. 2B a separate integer adder 211A and a separate floating-point adder 211B replace the shared adder 210 and the first multiplexer 213 of FIG. 2A, and in FIG. 2B the source of the data type control signal 235 is not shown. Further details of FIG. 2B are shown in FIG. 10B.

The separate integer adder 211A receives the first integer product 250. The separate integer adder 211A may generate an integer partial sum 237 by adding the integer product 250 and the stored input partial sum 236, such as by using a binary adder.

The separate floating-point adder 211B receives the floating-point product 251. The separate floating-point adder 211B may generate a floating-point partial sum 238 by adding the floating-point product 251 and the stored input partial sum 236. The separate floating-point adder 211B can include adder significand logic such as a binary adder to calculate the significand of the floating-point partial sum 238. The floating-point adder 211B may also include adder exponent logic to calculate the exponent of the floating-point partial sum 238.

In other implementations, the separate integer adder 211A and the separate floating-point adder 211B may be configured to be add and generate other, different data types. To improve efficiency, the data type control signal 235 can optionally be used to disable one of the separate integer adder 211A or the separate floating-point adder 211B that does not correspond to the selected data type.

In some implementations, the opcode 230 may be configured to turn off one or both of the separate integer adder 211A and the separate floating-point adder 211B for power efficiency. For example, when the value of the opcode 230 indicates an integer data type, the opcode 230 may be used to turn off the separate floating-point adder 211B.

Figure 2C:
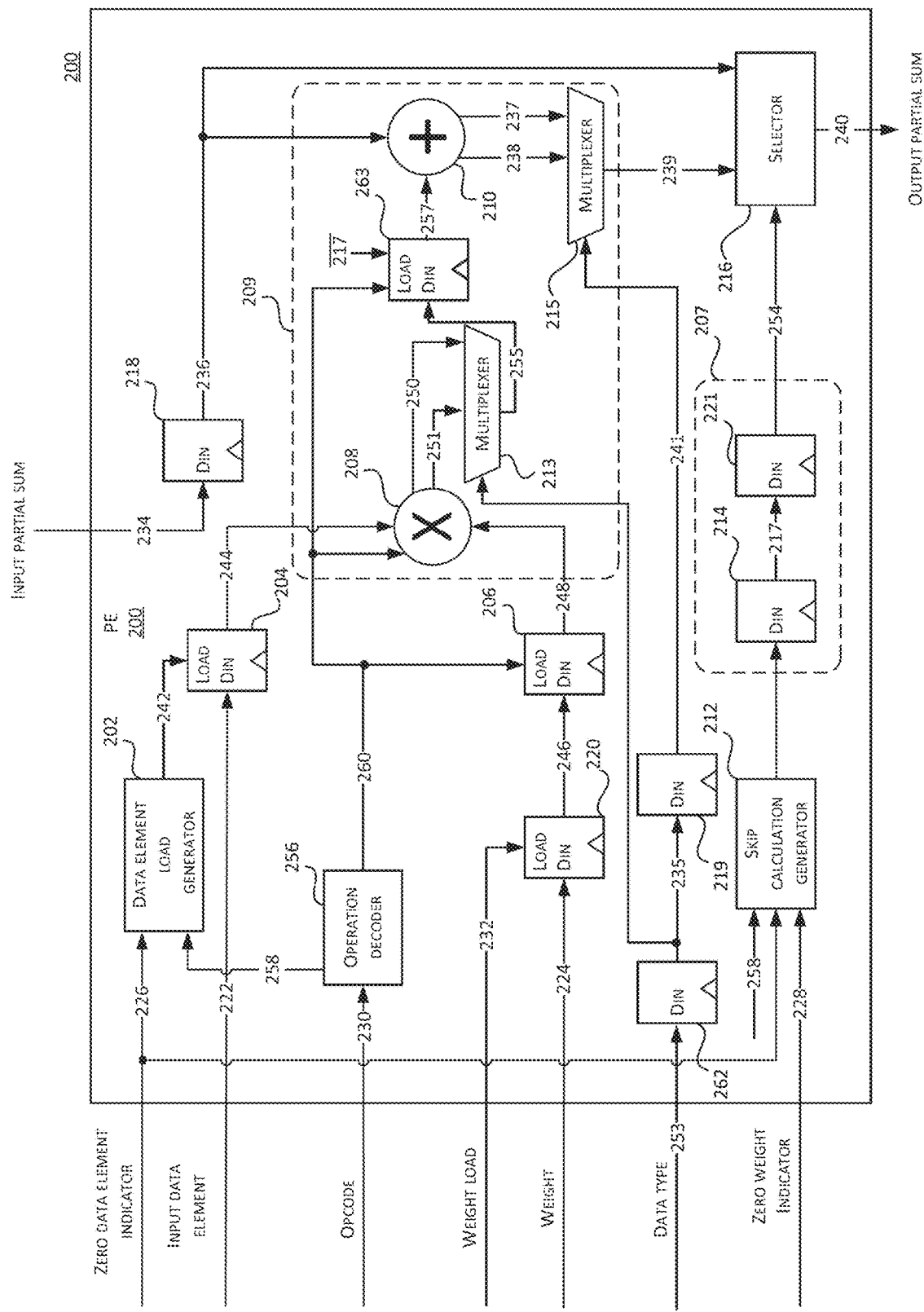
FIG. 2C illustrates a processing element for neural network computations including a shared multiplier, shared adder, and a delay register, according to certain examples of the disclosed technologies.
Figure 10C:
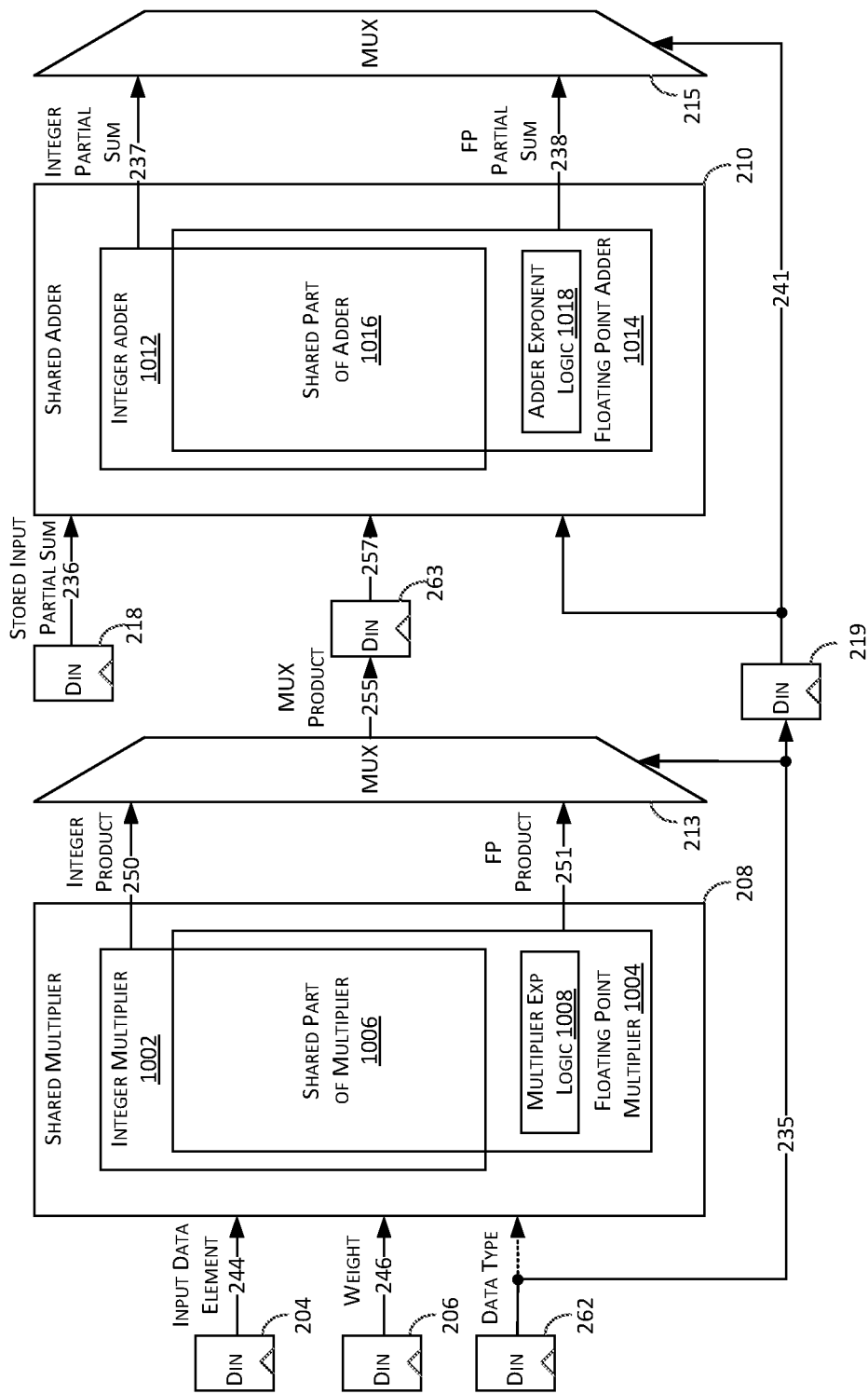
FIG. 10C illustrates an example of additional details of the multiply accumulate datapath of FIG. 2C.

FIG. 2C illustrates a PE similar to the PE shown in FIG. 2A except that: a delay register 263 is coupled in the multiply accumulate datapath 209 between the first multiplexer 213 and the shared adder 210, a delay register 221 is added to the skip calculation storage datapath 207, and the data type control signal 235 is stored in a data type delay register 219 to separately control the second multiplexer 215. Further details of FIG. 2C are shown in FIG. 10C.

The delay register 263 receives the first multiplexer product 255 from the first multiplexer 213 during an initial systolic cycle and provides a stored multiplexer result 257 to the shared adder 210 during a subsequent systolic cycle. The delay register 263 can temporarily store the first multiplexer product 255 generated by the first multiplexer 213 during a first systolic interval of a multiply-delayed-accumulate operation for delayed use by the shared adder 210 during a subsequent systolic interval of the multiply-delayed-accumulate operation. For example, during a first systolic interval, the shared multiplier 208 can generate a first value for the integer product 250 and first value for the floating-point product 251, and the first multiplexer 213 can select one of the product values to be stored in the delay register 263. During a second systolic interval that follows the first systolic interval, the delay register 263 can provide the first stored multiplexer result 257 to the shared adder 210 and store a second value selected as the first multiplexer product 255 from among a second integer product 250 and second floating-point product 251 calculated by the shared multiplier 208. During a third systolic interval that follows the second systolic interval, the delay register 263 can provide the second value to the shared adder 210 and store a third value for the first multiplexer product 255 selected by the first multiplexer 213 from among a third integer product 250 and third floating-point product 251 calculated by the shared multiplier 208. Accordingly, the delay register 263 acts to separate the multiplier 208 and the adder 210 into different stages of a pipeline, thereby allowing the speed of the systolic interval to be improved to intervals shorter than the combined processing time of the multiplier 208 and adder 210.

The delay register 263 can be enabled during operational, non-zero conditions. If a zero is provided as an input data element or as a weight preceding a first systolic interval, then the delay register 263 can skip writing the first multiplexer product 255 received from the output of the first multiplexer 213 during the first systolic interval. An inverted skip calculation indicator 217 can be used to activate the delay register 263 during non-skip conditions. The inverted skip calculation indicator 217 can disable or skip writing to the delay register during skip conditions.

The delay register 221 can be included in the skip calculation storage datapath 207 along with delay register 214 such that the stored skip calculation indicator 254 is provided to the selector 216 during a systolic interval in sync with the corresponding data propagated through the multiply accumulate datapath 209.

The data type control signal 235 can be stored in a data type delay register 219 to be provided as the delayed data type control signal 241 to the adder pipeline stage at the appropriate time. During a first systolic interval, the data type control signal can be stored in a data type delay register 219, provided to the first multiplexer 213 to select between the integer product 250 and floating-point product 251 generated during a first multiplication operation, and optionally provided to the shared multiplier 208 to disable circuitry for multiplying a non-selected data type. During the second systolic interval, the delayed data type control signal 241 can be provided to the second multiplexer 215 to select between the integer partial sum 237 and floating-point partial sum 238 while a new data type control signal 235 can be provided to the first multiplexer 213 to select the appropriate product generated by a second multiplication operation. During the second systolic interval, the delayed data type control signal 241 can optionally be provided to the shared adder 210 to disable circuitry specific to adding the non-selected data type.

Figure 2D:
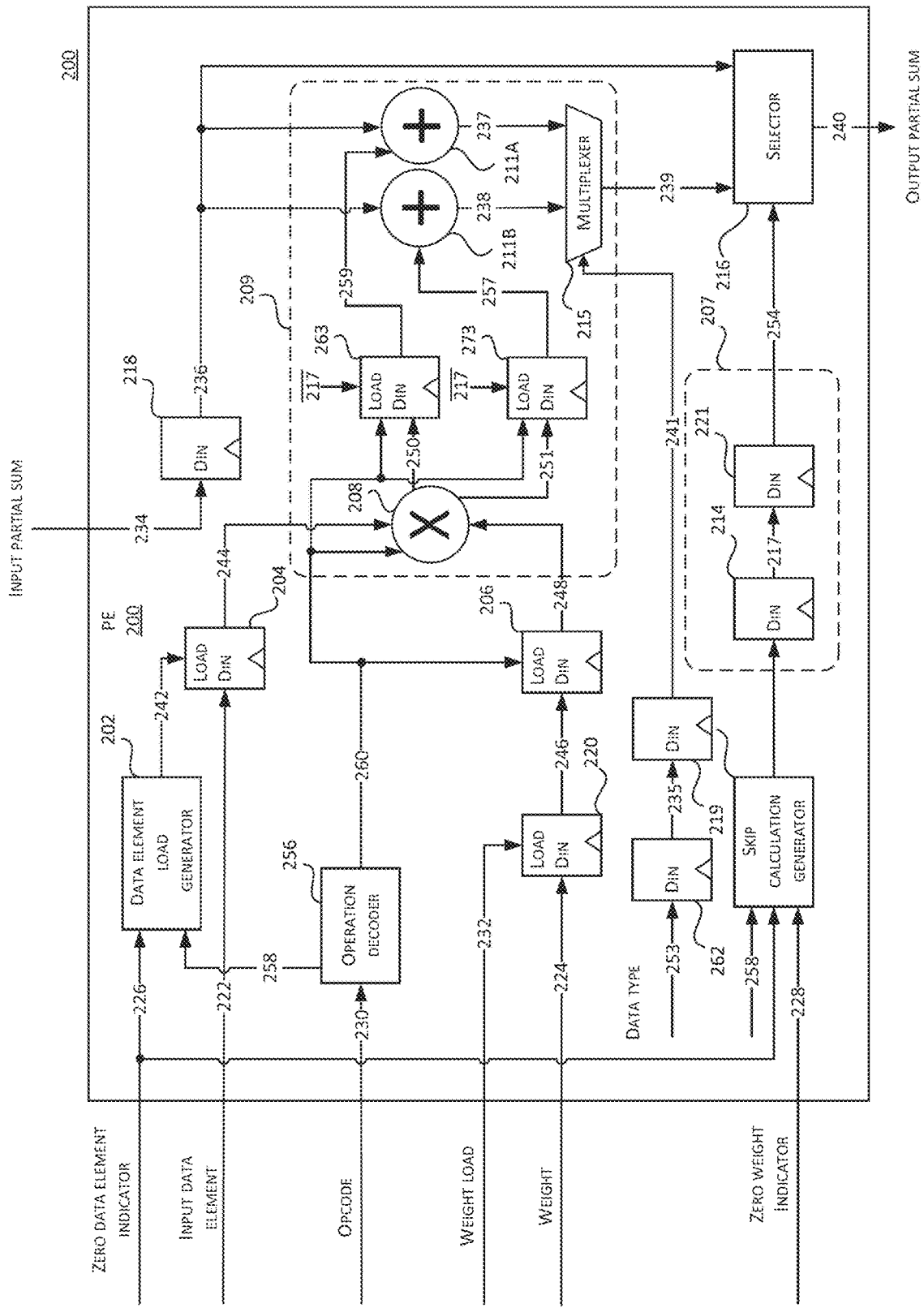
FIG. 2D illustrates a processing element for neural network computations including a shared multiplier, separate adders, and delay registers, according to certain examples of the disclosed technologies.
Figure 10D:
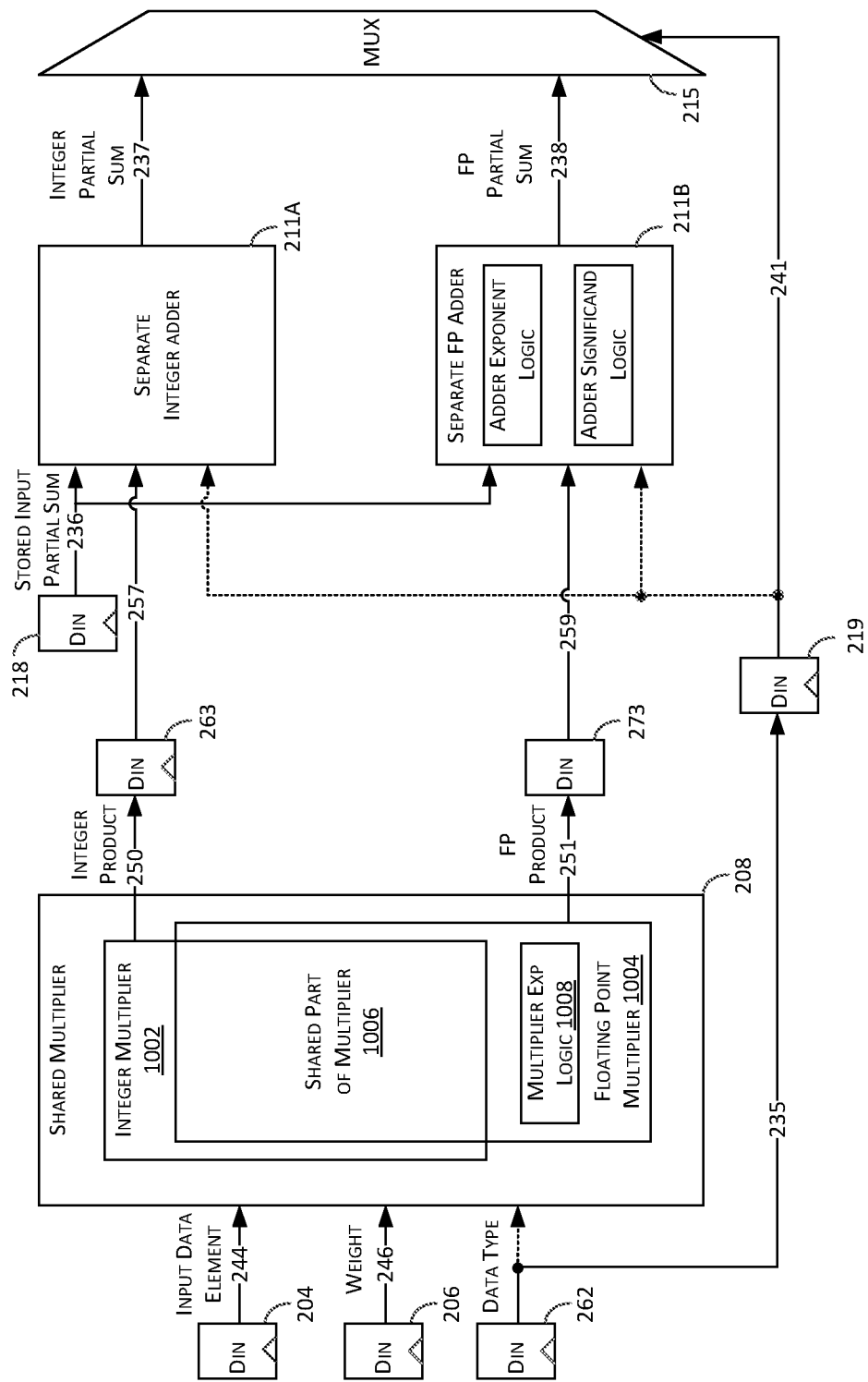
FIG. 10D illustrates an example of additional details of the multiply accumulate datapath of FIG. 2D.

FIG. 2D illustrates a PE similar to the PE shown in FIG. 2B except that: the outputs of the shared multiplier 208 are stored in a first delay register 263 and a second delay register 273, the data type control signal 235 is delayed through data type delay register 262, and a delay register 221 is included in the skip calculation storage datapath 207. Further details of FIG. 2D are shown in FIG. 10D.

The first delay register 263 and the second delay register 273 are connected between the shared multiplier 208 and the separate integer adder 211A and the separate floating-point adder 211B. The first delay register 263 receives an integer product 250 from the shared multiplier 208 during an initial systolic cycle and provides a first stored integer product 257 to the separate integer adder 211A during a subsequent systolic cycle. The second delay register 273 receives a floating-point product 251 from the shared multiplier 208 during an initial systolic cycle and provides a first stored floating-point product 259 to the separate floating-point adder 211B during a subsequent systolic cycle.

The first and second delay registers 263 and 273 can temporarily store the integer product 250 and FP product 251, respectively, generated by the shared multiplier 208 during a first systolic interval of a multiply-delayed-accumulate operation for delayed use by the separate integer adder 211A and the separate floating-point adder 211B during a subsequent systolic interval of the multiply-delayed-accumulate operation. For example, during a first systolic interval, the first delay register 263 can store a first value for the integer product 250 generated by the shared multiplier 208 and the second delay register 273 can store a first value for the FP product 251 generated by the shared multiplier 208. During a second systolic interval that follows the first systolic interval, the first delay register 263 can provide the stored first value for the stored integer product 257 to the separate integer adder 211A and store a second value for the integer product 250 generated by the shared multiplier 208. During the second systolic interval, the second delay register 273 can provide the stored first value for the FP product 251 to the separate floating-point adder 211B and store a second value for the FP product 251 generated by the shared multiplier 208.

The first and second delay registers 263 and 273 can be enabled during operational, non-zero conditions. If a zero is provided as an input data element or as a weight preceding a first systolic interval, then the first and second delay registers 263 and 273 can skip writing the first and second products 250 and 251 received from the output of the shared multiplier 208 during the first systolic interval. An inverted skip calculation indicator 217 can be used to activate the first and second delay registers 263 and 273 during non-skip conditions. The inverted skip calculation indicator 217 can disable or skip writing to the first and second delay registers 263 and 273 during skip conditions.

Figure 3:
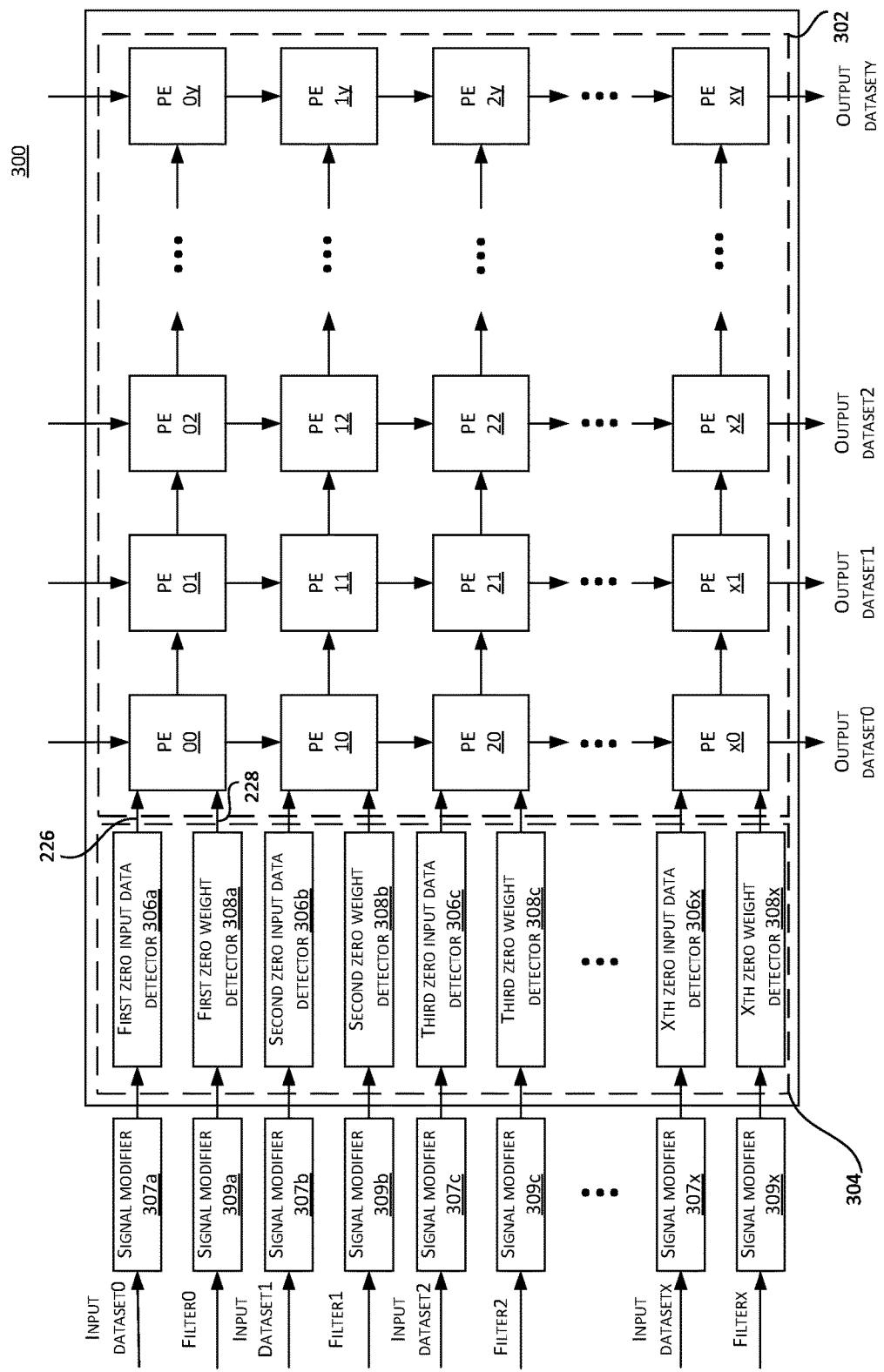
FIG. 3 illustrates an apparatus including signal modifiers and zero detector circuits for input data elements and weights entering a systolic array for neural network computations, according to certain examples of the disclosed technologies.

FIG. 3 illustrates an apparatus 300 including signal modifiers and zero detector circuits for input data elements and weights entering a systolic array for neural network computations, according to certain examples of the disclosed technologies.

The apparatus 300 may include a two-dimensional systolic array 302 comprising PEs arranged into rows and columns. The systolic array 302 may be similar to the systolic array 100 in FIG. 1. A first row of the systolic array 302 may include PE 00, PE 01, PE 02, . . . , PE 0y, a second row of the systolic array 302 may include PE 10, PE 11, PE 12, . . . , PE 1y, a third row of the systolic array 302 may include PE 20, PE 21, PE 22, . . . , PE 2y, and an Xth row of the systolic array 302 may include PE x0, PE x1, PE x2, . . . , PE xy. The x and y may include positive integers, e.g., 32, 64, 128, or any suitable number. Each PE of the systolic array 302 may be similar to the PE 200, and include means to perform arithmetic computations using power efficient methods, as discussed with reference to FIG. 2A, FIG. 2B, FIG. 2C, and FIG. 2D.

In certain examples, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a, the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, . . . , and the Xth zero input data detector 306x may be configured to detect a zero value on a respective input data element in an input dataset0, an input dataset1, an input dataset2, . . . , and an input datasetx respectively. Similarly, the first zero weight detector 308a, the second zero weight detector 308b, the third zero weight detector 308c, . . . , and the Xth zero weight detector 308x may be configured to detect a zero value on a respective weight value in a filter0, a filter1, a filter2, . . . , and a filterx respectively.

In certain examples, a first (e.g., leftmost) PE in each row of the systolic array 302 may be coupled to a respective signal modifier that quantizes, de-quantizes, and/or partially de-quantizes an input data element, and a respective zero weight detector circuit that quantizes, de-quantizes, and/or partially de-quantizes a weight value entering the systolic array 302. For example, the PE 00 in the first row may be coupled to signal modifiers 307a and 309a, the PE 10 in the second row may be coupled to signal modifiers 307b and 309b, the PE 20 in the third row may be coupled to signal modifiers 307c and 309c, and the PE x in the Xth row may be coupled to an Xth signal modifiers 307x and 309x. The signal modifier 307a . . . 307x may be configured to quantize, de-quantize, and/or partially de-quantize a respective input data element in an input dataset0, an input dataset1, an input dataset2, . . . , and an input datasetx respectively. Similarly, the signal modifiers 309a . . . 309x may be configured to quantize, de-quantize, and/or partially de-quantize a respective weight value in a respective row.

Each of the input dataset0, the input dataset1, the input dataset2, . . . , and the input datasetx may belong to an image, a text, a video clip, an audio clip, or another type of data set which may need to be processed by a neural network processor for convolution computations. The native input data may be in an excessively precise format or in an asymmetrically quantized format. If the native input data is in an excessively precise format, the native data input data can be quantized into a shorter data format for more efficient calculations. If the input data is asymmetrically quantized, then the input data can be at least partially de-quantized by adding an extra bit to the data length and shifting the input data to into a symmetric representation, thereby allowing the processing elements to avoid including complex circuitry to handle nonzero representations of zero. For example, 8-bit integers can be partially de-quantized into 9-bit integers without losing accuracy. Data types of other lengths can similarly be increased in length and partially de-quantized without losing accuracy.

Each of the input dataset0, the input dataset1, the input dataset2, . . . , and the input datasetx may be provided to each of a signal modifier 307a, a signal modifier 307b, a signal modifier 307c, . . . , and a signal modifier 307x. Each of the signal modifiers may be configured to do quantizing, de-quantizing, and/or partially de-quantizing of the input dataset0, the input dataset1, the input dataset2, . . . , and the input datasetx. In some instances, each of the signal modifiers may be configured to do some combination of shifting, quantizing, or de-quantizing either partially or in whole. In some instances, each of the signal modifiers may be configured to partially de-quantize each of the input data elements for each row of the processing elements. For example, each of the signal modifiers may be configured to shift each of the input data elements and add an extra bit to the representation of each of the input data elements.

In some instances, the input dataset0, the input dataset1, the input dataset2, . . . , and the input datasetx may be associated with output dataset0, output dataset1, output dataset2, . . . , output datasety generated by an intermediate layer of the convolution operation. For example, the output dataset0, output dataset1, output dataset2, . . . , output datasety may go through activation functions and fed back to the systolic array 302 as the input dataset0, the input dataset1, the input dataset2, . . . , and the input datasetx. The filter0, the filter1, the filter2, . . . , and the filterx may include different sets of weight values to convolve with the input dataset0, the input dataset1, the input dataset2, . . . , and the input datasetx. The weight values in the filter0, the filter1, the filter2, . . . , and the filterx may be pre-determined using supervised learning, non-supervised learning, or any suitable method of determining convolution filters.

Each zero input data detector for the respective row may be configured to detect whether an input data element from the input dataset entering the respective row is "0" and generate a corresponding zero input data indicator for that input data element. The corresponding zero data element indicator may be passed into the first PE of the respective row along with the input data element. For example, the PE 00 may be the first PE of the first row in the systolic array 302. The PE 00 may be configured to receive input data elements from the input dataset0 prior to other PEs in the first row (e.g., PE 01, PE 02, . . . , PE 0y). In some examples, one input data element at a time may be fed sequentially, in uniform time periods, from the input dataset0 to the PE 00. The first zero input data detector 306a may be configured to generate the zero data element indicator 226 in each of the uniform time periods (e.g. clock cycles) for each input data element from the input dataset0. The zero data element indicator 226 corresponding to each input data element may be fed to the PE 00 sequentially, in uniform time periods, along with each input data element. The PE 00 may store or skip storing the input data element 222 based on the value of the respective data load signal 242. In some implementations, the first zero input data detector 306a may include a comparator to compare the incoming input data element with a zero to assert (e.g., set to "1") or de-assert (e.g., set to "0") the zero data element indicator 226 based on the value of the incoming input data element. For example, the comparator may be implemented using an OR, XOR, NAND, or any suitable circuit.

Each of the filter0, the filter1, the filter2, . . . , and the filterx may be provided to each of a signal modifier 309a, a signal modifier 309b, a signal modifier 309c, . . . , and a signal modifier 309x. Each of the signal modifiers may be configured to do quantizing, de-quantizing, or partial de-quantizing of the filter0, the filter1, the filter2, . . . , and the filterx. In some instances, each of the signal modifiers may be configured to do some combination of quantizing, de-quantizing, or partial de-quantizing. In some instances, each of the signal modifiers may be configured to partially de-quantize each of the filters for each row of the processing elements. For example, each of the signal modifiers may be configured to shift each of the filters and add an extra bit to the representation of each of the filters.

Each zero weight detector for the respective row may be configured to detect whether a weight value from a set of weight values entering the respective row is zero and generate a corresponding zero weight indicator for that weight value. For example, the first zero weight detector 308a may be configured to detect whether a weight value from the filter0 (e.g., the weight 224) includes a zero value and generate the zero weight indicator 228 for the weight. In some implementations, the first zero weight detector 308a may include a comparator to compare the weight value with a zero to assert (e.g., set to "1") or de-assert (e.g., set to "0") the zero weight indicator 228. For example, the comparator may be implemented using an OR, XOR, NAND, or any suitable circuit. In one example, one weight value at a time may be fed sequentially, in uniform time periods, from the filter0 to the PE 00 for pre-loading the respective weight values in the PE 00 to the PE 0y prior to starting the arithmetic computations. The first zero weight detector 308a may generate a corresponding zero weight indicator for each of those weight values which may be fed to the PE 00 sequentially, in uniform time periods, along with the corresponding weight value. The PE 00 may pass the respective weight values and the corresponding zero weight indicators sequentially to the next neighboring PE until all the PEs in the first row have been preloaded with the respective weight values and the corresponding zero weight indicators. The respective weight value and the corresponding zero weight indicator may be cached in each PE before the respective input data elements are fed to each row in the systolic array 302.

The second zero input data detector 306b, the third zero input data detector 306c, . . . , and the Xth zero input data detector 306x may be similar to the first zero input data detector 306a, and may generate a respective zero data element indicator, similar to the zero data element indicator 226, to provide to the PE 10, PE 20, . . . , and PE x, sequentially, in the uniform time periods, for power optimization. The respective zero data element indicator generated for each row may be received by a respective first PE in each row via the respective row input bus 102, and propagated, sequentially, in the uniform time periods, by the first PE to all the PEs in the given row. The second zero weight detector 308b, the third zero weight detector 308c, . . . , and the Xth zero weight detector 308x may be similar to the first zero weight detector 308a, and may generate a respective zero weight indicator, similar to the zero weight indicator 228, to provide to the PE 10, PE 20 . . . , and PE x, sequentially, to pre-load each PE in the respective row along with the respective weight value prior to starting the arithmetic computations.

In some examples, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other examples, the circuit 304 and the systolic array 302 may be part of a computing engine, which may be configured to perform arithmetic computations for the convolution operations. Some examples of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

Although FIG. 3 shows the signal modifiers 307a-307x and 309a-309x preceding the zero weight detectors 306a-306x and 308a-308x, the order of these elements can be changed in other examples. Although FIG. 3 shows signal modifiers 307a-307x and 309a-309x outside of the PE's for a more efficient layout, the signal modifiers 307a-307x and 309a-309x could also be included in each individual PE.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective input data element and the respective weight value along with some control signals (e.g., opcode 230, weight load 232, data type, etc.), which may be propagated from the left to the right of the systolic array 302 for each row. This is further explained with reference to FIG. 4.

Figure 4:
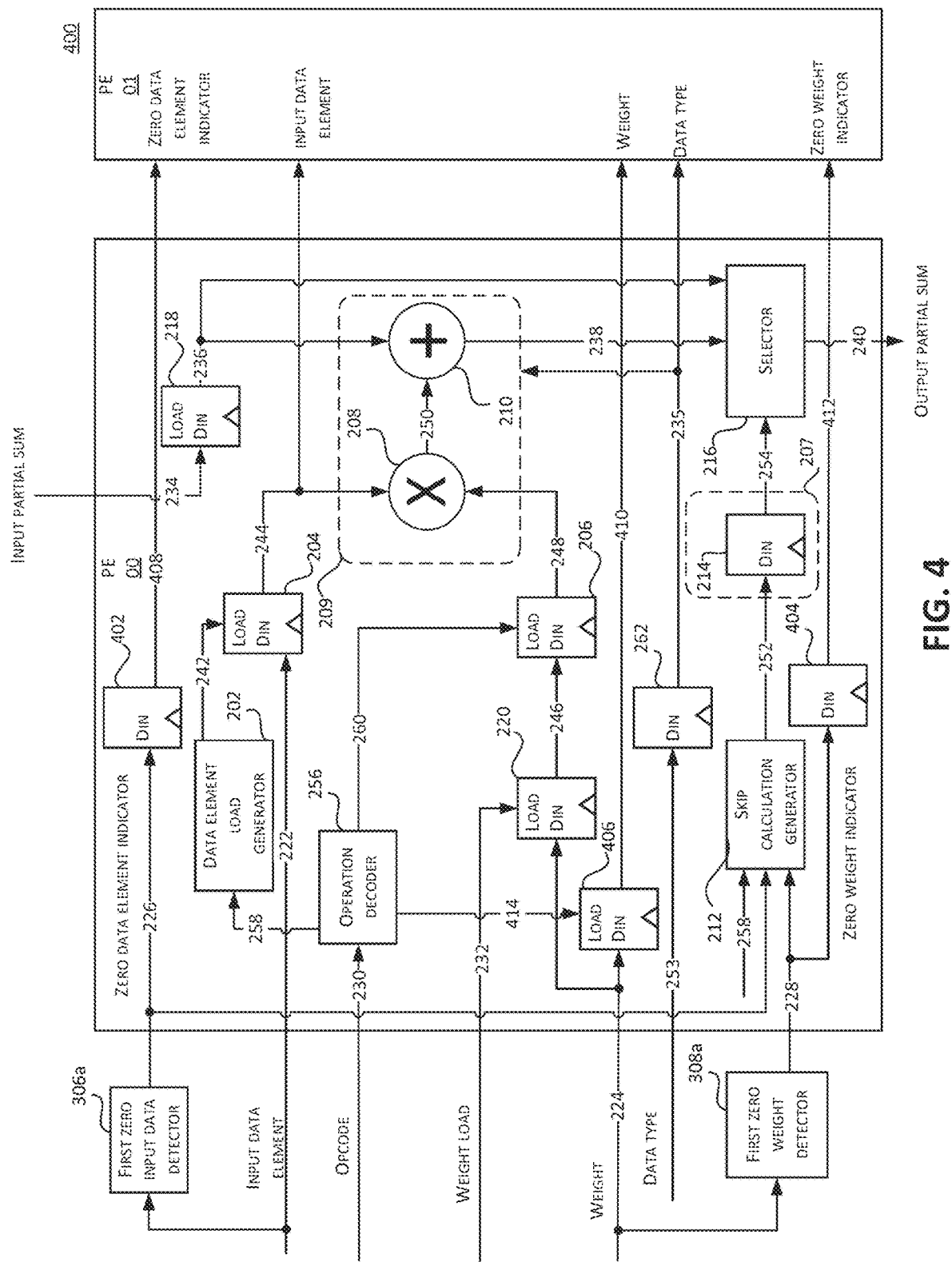
FIG. 4 illustrates an apparatus showing propagation of data type, zero detectors, the input data element, and the weight value from one processing element to another, according to a first example of the disclosed technologies.

FIG. 4 illustrates an apparatus 400 showing propagation of zero indicators, the input data element and the weight value from one PE to another, according to a first example of the disclosed technologies.

In some examples, each PE of the systolic array 302 as shown in FIG. 3 may include components, in addition to the components of the PE 200 as shown in FIG. 2A, FIG. 2B, FIG. 2C, and FIG. 2D, to cache the weight and to cache the zero indicators before passing them to a neighboring PE in a given row. For example, each PE may include a zero data element indicator register 402, a zero weight indicator register 404, and an output weight register 406, in addition to the components of the PE 200. This is further explained in FIG. 4 using the PE 00 and the PE 01 as an example. The PE 00 and the PE 01 are part of the systolic array 302 as discussed with reference to FIG. 3.

The zero data element indicator register 402 may be configured to store the zero data element indicator 226 received by the PE 00 to provide a stored zero data element indicator 408. The zero data element indicator 226 may correspond to the input data element 222 received by the PE 00. As discussed with reference to FIG. 3, one input data element at a time may be fed sequentially, in uniform time periods, from the input dataset0 to the PE 00. The input data element register 204 may store or skip storing the input data element 222 for a current operation based on the data load signal 242. For example, if the zero data element indicator 226 is "1" or the NOP 258 is received by the PE 00 for the current operation, the input data element register 204 may hold the value from the previous operation or a default value. The stored input data element 244 may be provided to the PE 01 as the input data element 222.

Thus, in certain examples, if a zero is detected on the input data element 222 received by the PE 00 for the current operation, the zero value of the input data element 222 may not be propagated to the PE 01-PE 0y since the stored input data element 244 may hold the value from the previous operation or the default value. However, the stored zero data element indicator 408 corresponding to the zero value of the input data element 222 may be propagated to the neighboring PEs. The PE 01 may receive the stored zero data element indicator 408 as the zero data element indicator 226, store it, and propagate its stored zero data element indicator 408 to the neighboring PE (e.g., PE 02). The PE 01 may also propagate its stored input data element 244 from the previous operation to PE 02 along with the stored zero data element indicator 408. Thus, the zero data element indicator 226 may only be generated once by the first zero input data detector 306a, and passed sequentially, in uniform time periods, from the PE 00 to the PE 0y. The respective stored zero data element indicator 408 in each PE may be used to bypass the respective first product 250 and second product 251 in each PE if the input data element 222 includes a zero value. Thus, the respective output partial sum 240 in each PE may be the respective input partial sum 234 if the respective input data element 222 or the respective weight 224 includes a zero value or a NOP is received for that operation.

The zero weight indicator register 404 may be configured to store the zero weight indicator 228 received by the PE 00 to provide a stored zero weight indicator 412. The zero weight indicator 228 may correspond to the weight 224 received by the PE 00. The PE 00 may be configured to receive the weight 224 for pre-loading the weights in the systolic array 302 prior to starting the arithmetic computations. For example, in one example, one weight value at a time may be fed sequentially, in uniform time periods, from the filter0 to the PE 00. The PE 00 may store the received weight value in the output weight register 406 to provide a stored weight value 410 based on a shift weight signal 414. The stored weight value 410 may be shifted into the PE 01 as the weight 224. The shift weight signal 414 may be generated by the operation decoder 256 based on the opcode 230. For example, the opcode 230 may include a certain opcode value to indicate shifting of the weight value from one PE to another PE. The PE 01 may receive the stored zero weight indicator 412 as the zero weight indicator 228 in the next time period, store it, and propagate its stored zero weight indicator 412 to the neighboring PE (e.g., PE 02). Thus, the zero weight indicator 228 may only be generated once by the first zero weight detector 308a, and passed sequentially, in uniform time periods, from the PE 00 to the PE 0y along with the corresponding weight value.

In certain examples, the same weight value may be used by all the PEs in a given row for convolving with each input data element for an input data set to optimize the memory bandwidth. In some examples, instead of pre-loading the weights in the systolic array, respective weights may be fed into each row along with the input data elements to perform arithmetic computations. This is further explained with reference to FIG. 5.

The multiply accumulate datapath 209 may include components of the multiply accumulate datapath 209 as illustrated by FIG. 4, FIG. 2A, FIG. 2B, FIG. 2C, FIG. 2D, FIG. 10A, FIG. 10B, FIG. 10C, or FIG. OD. The multiply accumulate datapath 209 may incorporate any of the circuits or components contained therein in any combination. For example, the multiply accumulate datapath 209 may include a shared multiplier, a shared adder, and/or one or more separate adders. The multiply accumulate datapath 209 may be configured to provide multiple partial sums to a multiplexer and/or one or more delay registers. For example, the multiply accumulate datapath 209 may provide an integer partial sum, a non-integer partial sum, or any combination thereof. The multiply accumulate datapath 209 may be configured to receive a stored weight value 248, a stored input data element 244, the start computations signal 260 (not shown in FIG. 4), and the data type control signal (not shown in FIG. 4).

The skip calculation storage datapath 207 may include components in addition to the components illustrated in FIG. 4. In some examples, the skip calculation storage datapath 207 can include an additional register 221, such as described with respect to FIG. 2C.

Figure 5:
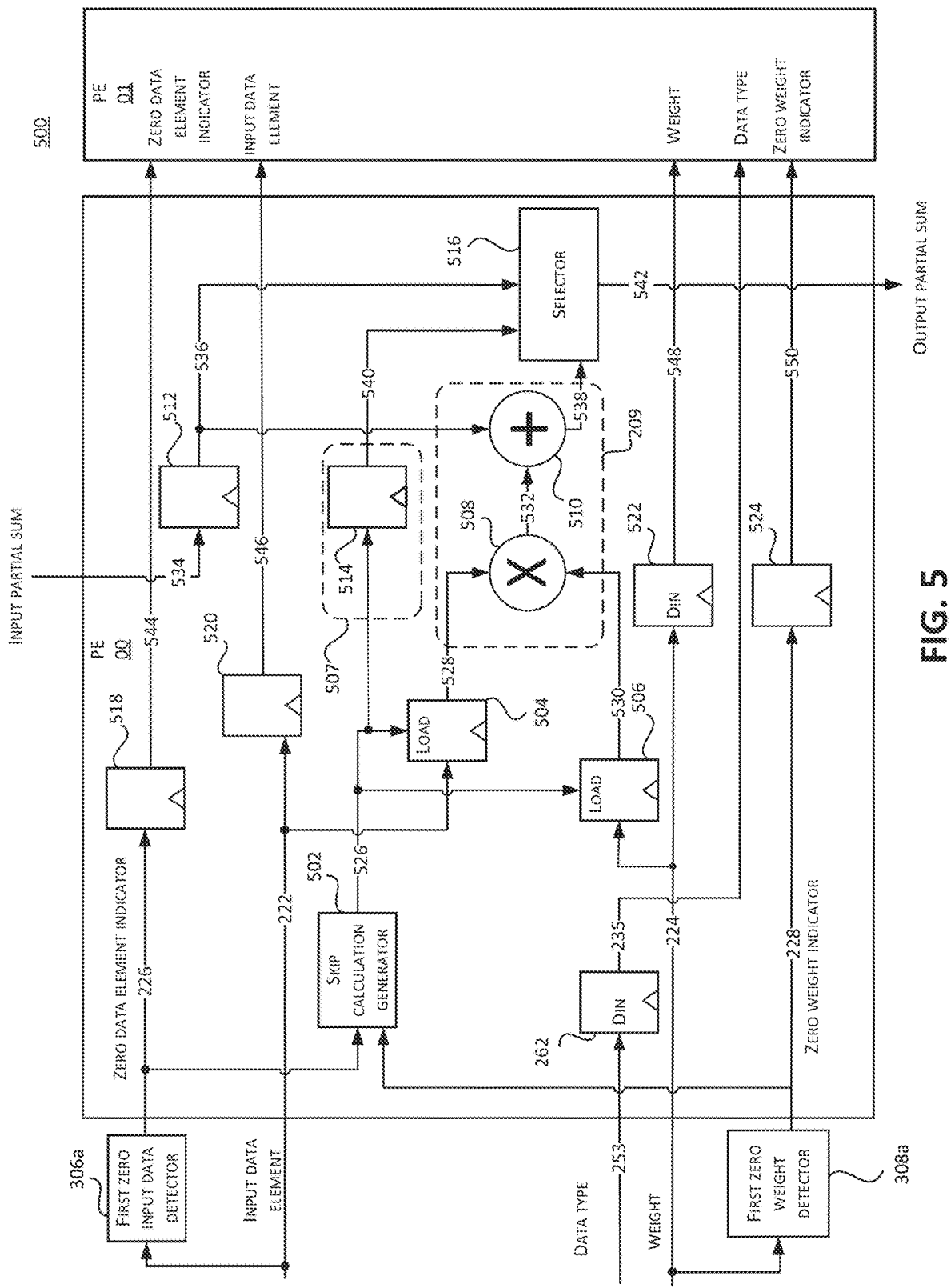
FIG. 5 illustrates an apparatus showing propagation of zero indicators, the input data element, and the weight value from one processing element to another, according to a second example of the disclosed technologies.

FIG. 5 illustrates an apparatus 500 showing propagation of zero detectors, the input data element and the weight value from one PE to another, according to a second example of the disclosed technologies.

In the second example, instead of pre-loading the weights in the systolic array, one weight value at a time may be fed sequentially, in uniform time periods, from the filter0 to the PE 00, along with the input data element 222. The input data element 222 and the weight 224 may be cached in their respective registers only if no zero is detected on both the input data element 222 and the weight 224. Thus, the shared multiplier inputs may not toggle if a zero is detected on either the input data element 222 or the weight 224 resulting in reduced power consumption. The input data element 222 and the weight 224 may be propagated to the neighboring PEs along with the zero data element indicator 226 and the zero weight indicator 228.

In the second example, a skip calculation generator 502 may be configured to generate a skip calculation indicator 526 using the zero data element indicator 226 and the zero weight indicator 228. The skip calculation indicator 526 may be used by a data register 504 and a weight register 506 to skip storing of a zero value on the input data element 222 or the weight 224 respectively for a current operation. In some examples, the skip calculation generator 502 may perform an OR, or an NOR operation on the zero data element indicator 226 and the zero weight indicator 228 to generate the skip calculation indicator 526. The skip calculation indicator 526 may be stored in a skip calculation register 514 to provide a stored skip calculation indicator 540 that may be used by a selector 516. The skip calculation storage datapath 507 may include components in addition to the components illustrated in FIG. 5. In some examples, the skip calculation storage datapath 507 can include an additional register 221, such as described with respect to the skip calculation storage datapath 207 of FIG. 2C.

The data register 504 may be configured to store the input data element 222, or skip storing of the input data element 222 to provide a stored input data element 528 based on the skip calculation indicator 526 for a current operation. For example, if the skip calculation indicator 526 is "0", the data register 504 may store a new value for the input data element 222, and if the skip calculation indicator 526 is "1", the data register 504 may skip storing the new value for the input data element 222. According to certain examples, skipping the storing of the new value by the data register 504 may result in not toggling the stored input data element 528 and holding the previous value of the stored input data element 528.

The weight register 506 may be configured to store the weight 224, or skip storing of the weight 224 to provide a stored weight value 530 based on the skip calculation indicator 526 for the current operation. For example, if the skip calculation indicator 526 is "0", the weight register 506 may store a new value for the weight 224, and if the skip calculation indicator 526 is "1", the weight register 506 may skip storing the new value for the weight 224. According to certain examples, skipping the storing of the new value by the weight register 506 may result in not toggling the stored weight value 530 and holding the previous value of the stored weight value 530.

The multiplier 508 may be configured to perform a multiplication operation between the stored input data element 528 and the stored weight value 530 to provide a multiplication result 532. In some implementations, when a value of either the input data element 222, or the weight 224 for a current operation is zero, storing of both the input data element 222 and the weight 224 in the data register 504 and the weight register 506 respectively can be skipped using the skip calculation indicator 526. For example, the zero data element indicator 226 or the zero weight indicator 228 may generate a value of "1" for the skip calculation indicator 526, which can disable loading of the respective inputs into the data register 504 and the weight register 506. In this case, the stored input data element 528 and the stored weight value 530 may hold their values from the previous operation and may not toggle. Thus, the multiplication result 532 may not change and the dynamic power consumption can be reduced. Since the multiplication result 532 may not be accurate for the current operation, the multiplication result 532 is not propagated to other PEs in the array.

The PE 00 may receive an input partial sum 534, which may be stored in an input partial sum register 512 to provide a stored input partial sum 536. The adder 510 may be configured to perform an addition operation on the multiplication result 532 and the stored input partial sum 536 to provide an addition result 538. In some examples, in place of the multiplier 508 and the adder 510, a fused multiplier-adder may be used to perform both the multiplication and addition operations in a single step.

A multiply accumulate datapath 209 may include components of the multiply accumulate datapath 209 as illustrated by FIG. 4, FIG. 2A, FIG. 2B, FIG. 2C, or FIG. 2D, FIG. 10A, FIG. 10B, FIG. 10C, or FIG. 10D. The multiply accumulate datapath 209 may incorporate any of the circuits or components contained therein in any combination. For example, the multiply accumulate datapath 209 may include a shared multiplier, a shared adder, or both a shared multiplier and a shared adder. The multiply accumulate datapath 209 may include a shared multiplier, one or more adders, or both a shared multiplier and one or more separate adders. The multiply accumulate datapath 209 may be configured to provide multiple partial sums to the selector. For example, the multiply accumulate datapath 209 may provide an integer partial sum, a non-integer partial sum, or any combination thereof. The multiply accumulate datapath 209 may be configured to receive a stored weight value 248, a stored input data element 244, the start computations signal 260 (not shown in FIG. 4). The multiply accumulate datapath 209 may include one or more multiplexers or selectors. The multiply accumulate datapath 209 may include one or more delay registers.

The selector 516 may be configured to select either the addition result 538 or the stored input partial sum 536 based on the stored skip calculation indicator 540 to provide an output partial sum 542 via a seventh port. According to some examples, when a value of either the input data element 222, or the weight 224 for a current operation is zero, the addition result 538 may not provide a correct result for the current operation since the multiplication result 532 may hold a value for the previous operation. In such cases, the stored skip calculation indicator 540 may allow bypassing the addition result 538, and selecting the stored input partial sum 536 to provide the output partial sum 542. For example, when the stored skip calculation indicator 540 is "1", the stored input partial sum 536 may be selected as the output partial sum 542, and when the stored skip calculation indicator 540 is "0", the addition result 538 may be selected as the output partial sum 542. The selector 516 may be implemented using a multiplexer, or any suitable circuit.

In some examples, generation of the skip calculation indicator 526 may also be based on a value of an operation to be executed by the PE 00 as determined by the opcode 230 (not shown in FIG. 5). For example, for a NOP, the data register 504 and the weight register 506 can hold their values from a previous operation using the skip calculation indicator 526, thus reducing power consumption. The selector 516 may select the stored input partial sum 536 as the output partial sum 542 instead of the addition result 538.

The zero data element indicator register 518 may be configured to store the received zero data element indicator 226 to provide a stored zero data element indicator 544 to the neighboring PE 01 in the first row in the next time period.

The zero weight indicator register 524 may be configured to store the zero weight indicator 228 to provide a stored zero weight indicator 550 to the neighboring PE 01 in the first row in the next time period.

The output data register 520 may be configured to store the input data element 222 to provide a delayed input data element 546 to the neighboring PE 01 in the first row in the next time period.

The output weight register 522 may be configured to store the weight 224 to provide a delayed weight value 548 to the neighboring PE 01 in the first row in the next time period.

The stored zero data element indicator 544, the stored zero weight indicator 550, the delayed input data element 546, and the delayed weight value 548 may be provided to the PE 01 via the row output bus 108 as discussed with reference to FIG. 1. In some examples, the control signals received by the PE 00 from external circuitries may also be cached in the PE 00 and provided to the PE 01 via the row output bus 108. Thus, the respective input data element, weight value, zero data element indicator, and the zero weight indicator received by each PE every clock cycle may be cached in the respective PE, and the cached (delayed) values may be passed to the next neighboring PE in the next time period.

The stored zero data element indicator 544, the stored zero weight indicator 550, the delayed input data element 546, and the delayed weight value 548 may be received by the PE 01 as the zero data element indicator, the zero weight indicator, the input data element, and the weight respectively via the row input bus 102. The PE 01 may perform the arithmetic computations on the delayed input data element 546, and the delayed weight value 548 according to certain examples. The PE 01 may skip the multiplication operation if the delayed input data element 546, or the delayed weight value 548 includes a zero value based on the stored zero data element indicator 544 and the stored zero weight indicator 550, thus optimizing the dynamic power consumption of the PE 01. The PE 01 may store the stored zero data element indicator 544, the stored zero weight indicator 550, the delayed input data element 546, and the delayed weight value 548 in respective registers in the PE 01, and pass the delayed values to the neighboring PE 02 in the next time period.

Thus, the input dataset0 may be fed, one input data element every time period, into the first row of the systolic array 302, and passed sequentially from the PE 00 to the PE 0y. As the input data element 222 passes through a PE, the stored input data element 528 can be multiplied with the stored weight value 530, and accumulated with the stored input partial sum 536 by the adder 510. If either the input data element 222 or the weight 224 is zero, the inputs to the multiplier 508 may not change to reduce power consumption, and the stored input partial sum 536 may be provided as the output partial sum 542 via the column output bus 106. The output partial sum 542 of the PE 00 may be passed on as the input partial sum 534 for the neighboring PE 10 in the second row. The same operations may be repeated by each row of the systolic array 302 and corresponding output datasets may be generated.

Figure 6:
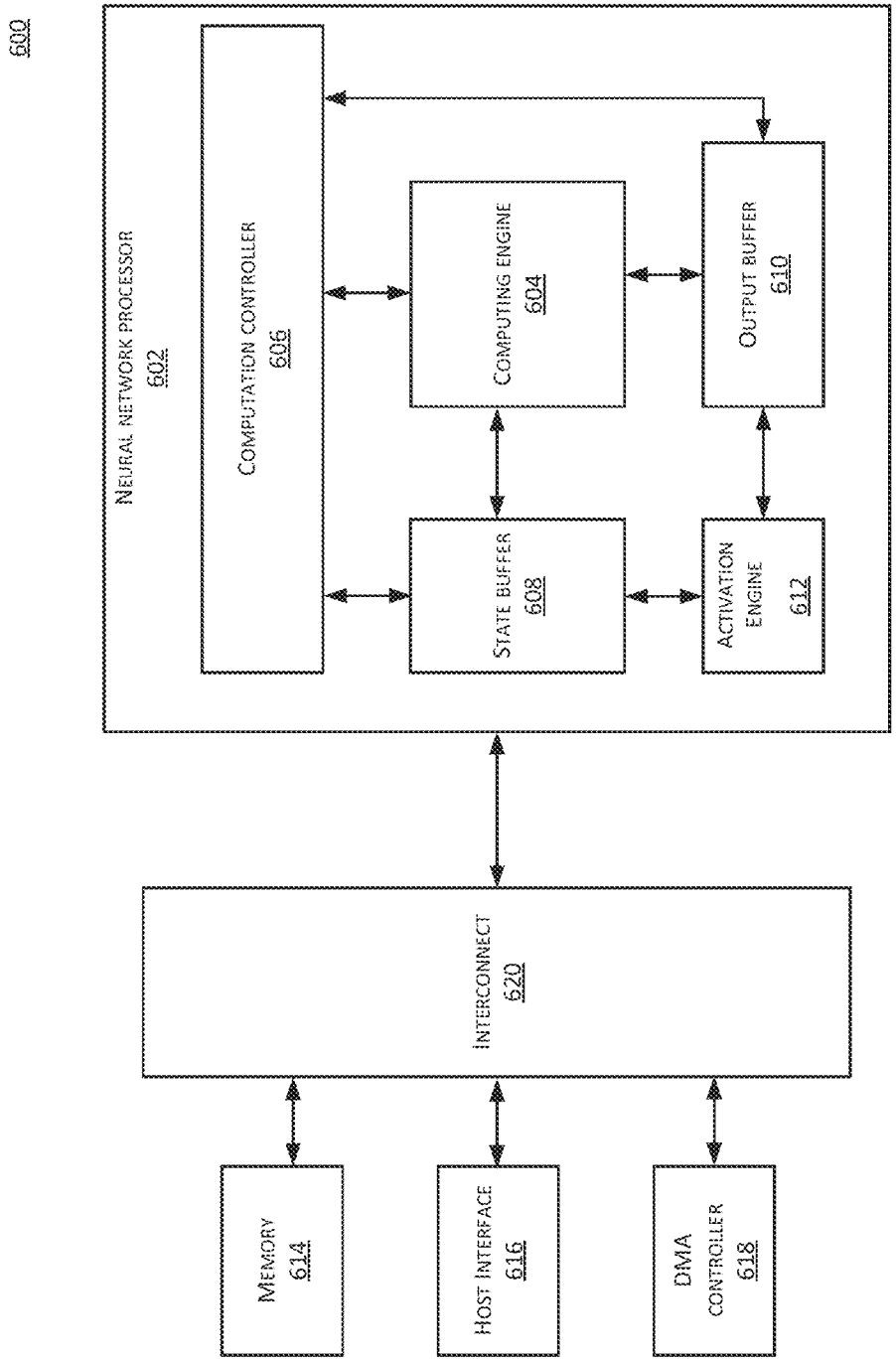
FIG. 6 shows an apparatus for neural network computations according to some examples of the disclosed technologies.

FIG. 6 shows an apparatus 600 for neural network computations according to some examples of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some examples, a host device may operate a software application and communicate with the apparatus 600 to make a prediction based on computations with a prediction model utilizing a neural network processor. For example, the host device can make the prediction by identifying information included in an input data set for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may be configured to store instructions, input data sets (e.g., pixel data of an image) and the weights (e.g., weights corresponding to certain visual and/or non-visual features) received from the host device. The memory 614 may also be configured to store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may be configured to enable communication between the host device and the neural network processor 602. For example, the host interface 616 may be configured to transmit memory descriptors including the memory addresses of the stored data (e.g., input data sets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may be configured to perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may be configured to provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may be configured to provide controls to various components of the neural network processor 602 to perform neural network computations. In some implementations, the computation controller 606 may read the instructions stored in the memory 614 and schedule the executions of the instructions by the computing engine 604. In the first example, the computation controller 606 may perform scheduling of loading the weights into the computing engine 604 prior to reading the input data elements from the state buffer 608. For example, as discussed with reference to FIG. 2A, FIG. 2B, FIG. 2C, FIG. 2D, and FIG. 4, the computation controller 606 may provide the opcode 230 and the weight load 232 to the computing engine 604 based on the instructions received from the host device. The computation controller 606 may provide appropriate values of the opcode 230 to the computing engine 604 which may be decoded by each PE in the computing engine to perform a corresponding operation. For example, the computing engine 604 may use the weight load 232 and the opcode 230 to pre-load the weights in all the PEs in the computing engine 604. Once the weights have been pre-loaded, the computation controller 606 may perform scheduling of loading the input data elements into the computing engine 604, sequentially, in uniform time periods, from the state buffer 608 to start the arithmetic computations.

In the second example, the computation controller 606 may perform scheduling of loading the weights and the input data elements into the computing engine 604, sequentially, in uniform time periods, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another example, the computation controller 606 may schedule loading of the weights in the systolic array 302 in parallel for each row using a respective column data bus for each PE in a given row. For example, weights for each row may be loaded in parallel per cycle. In some implementations, the computation controller 606 may determine a data type for the input data set based on the instructions received from the host device. The instructions may be in the form of an opcode. The data type may indicate a size and a type of the input data element, e.g., 4-bit, 8-bit, 9-bit, 16-bit, signed, unsigned, or floating-point.

The computing engine 604 may be configured to perform computations for the neural network. In some examples, the computing engine 604 may include a set of PEs configured to perform one or more arithmetic operations involved in the neural network computations. Each PE may perform multiply-accumulate operations using input data sets and associated weights. For example, the computing engine 604 may include the systolic array 302, and the circuit 304 comprising the zero input data detectors 306a-306x, and the zero weight detectors 308a-308x. In some examples, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first example, the weights may be pre-loaded prior to reading the input datasets from the state buffer 608, as discussed with reference to FIG. 4. The respective zero weight indicators corresponding to each weight may be cached locally in each PE and the cached values may be used to perform arithmetic computations with the respective input data element as the input data element is fed into the computing engine 604 along with the corresponding zero data element indicator. In the second example, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain examples, the computing engine 604 may perform the arithmetic computations to reduce the dynamic power consumption of the systolic array 302 using the respective zero data element indicator and the zero weight indicator signals as discussed with reference to FIGS. 2-5, and provide the computations results to be stored in the output buffer 610.

The output buffer 610 may include a set of registers to store the output data sets generated by the computing engine 604. In some implementations, the output buffer 610 may also enable additional processing such as, e.g., a pooling operation to reduce the size of the stored outputs. In some implementations, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some examples, the output buffer 610 may include adders to accumulate the partial sums generated for different sets of filters and input data sets to generate a convolution output array. The final output value of the convolution output array stored in the state buffer 608 can be retrieved by the computation controller 606 for storing at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
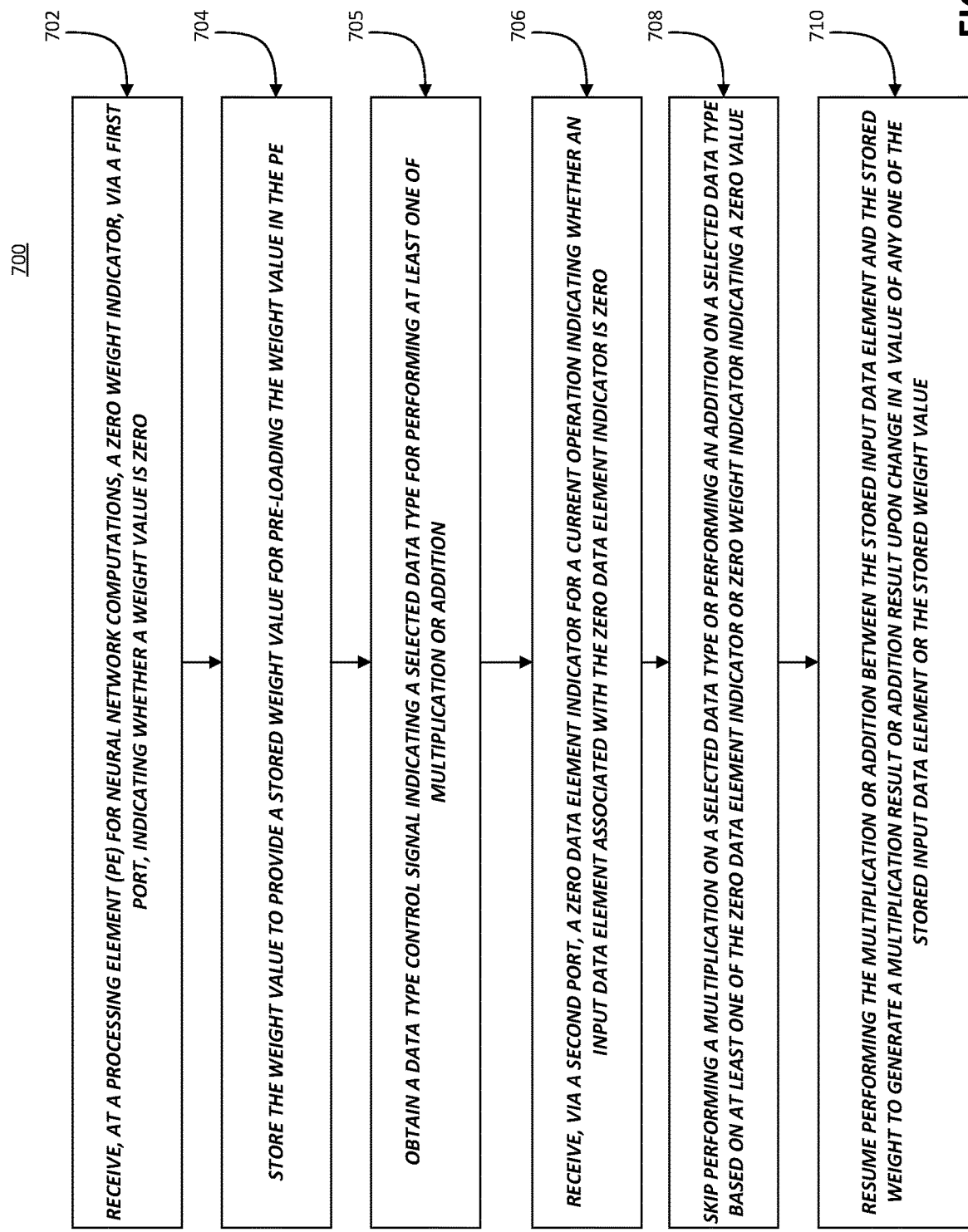
FIG. 7 shows a method executed by a processing element for neural network computations, according to some examples of the disclosed technologies.

FIG. 7 shows a method 700 executed by a PE for neural network computations, according to some examples of the disclosed technologies. The PE may be part of the systolic array 302, e.g., the PE 00 of FIG. 3. The systolic array 302 may be part of the computing engine 604 as seen in FIG. 6.

In a step 702, the PE may receive a zero weight indicator, via a first port, indicating whether the weight 224 is zero. The weight 224 may have been received from the host device into the memory 614. The PE 00 may receive the zero weight indicator 228 from the first zero weight detector 308a via the row input bus 102. As discussed with reference to FIG. 3, the first zero weight detector 308a may include comparators or other circuits to determine that the weight 224 is zero. For example, the first zero weight detector 308a may set the zero weight indicator 228 to "1" when it detects that the weight 224 is zero. The computation controller 606 may schedule loading of the weight 224 corresponding to the filter0, sequentially, in uniform time periods, from the state buffer 608 into the PE 00 of the computing engine 604 prior to scheduling loading of the input data elements into the PE 00.

In a step 704, the PE may store the weight value to provide a stored weight value for pre-loading the weight value in the PE. For example, the PE 00 may include means for pre-loading the weight 224 in the PE 00. The computation controller 606 may provide the opcode 230 to the computing engine 604 with a certain opcode value for loading the respective weights in each PE of the computing engine 604. As discussed with reference to FIG. 2A, FIG. 2B, FIG. 2C, and FIG. 2D, the weight 224 may be stored in the cached weight register 220 using the weight load 232. The cached weight 246 previously loaded into the cached weight register 220 may be shifted into the weight register 206 at the start of the arithmetic computations based on the start computations signal 260. The stored weight value 248 may be used to perform arithmetic computations with the stored input data element 244.

In a step 705, the PE can obtain a data type control signal indicating a selected data type for performing at least one of multiplication or addition on. The data type control signal can be received from a source outside of the PE, or the data type control signal can be decoded from one or more signals within the PE.

In a step 706, the PE may receive, via a second port, a zero data element indicator for a current operation indicating whether an input data element associated with the zero data element indicator is zero. As discussed with reference to FIG. 3, the PE 00 may receive the zero data element indicator 226 via the second port from the first zero input data detector 306a using the row input bus 102. The first zero input data detector 306a may include comparators or other circuits to determine that the input data element 222 is zero. For example, the first zero input data detector 306a may set the zero data element indicator 226 to '1" when it detects that the input data element 222 associated with the zero data element indicator 226 is zero.

In a step 708, the PE may skip at least one of the multiplication on the selected data type or the addition on the selected data type based on at least one of the zero data element indicator indicating that the input data element associated with the zero data element indicator is zero or the zero weight indicator indicating that the weight is zero. For example, multiplying the input data element 222 by the weight to generate an integer product 250 or 251 can be skipped based on the zero data element indicator 226 indicating that the input data element 222 associated with the zero data element indicator 226 is zero, even if the data type indicator indicates the integer data type.

In a step 710, the PE may resume performing multiplication operations on the selected data type or addition on the selected data type upon change in a value of any one of the stored input data element or the stored weight value. Thus, dynamic power consumption can be reduced by skipping a multiplication or addition operation.

Referring back to FIG. 4, the PE 00 may include the shared multiplier 208 to perform the multiplication operation between the stored input data element 244 and the stored weight value 248 to generate the first product 250 and the second product 251. The shared multiplier 208 may perform the multiplication upon a change in a value of either the stored input data element 244 in the input data element register 204, or the stored weight value 248 in the weight register 206. As discussed previously, the value of the stored input data element 244 in the input data element register 204 may change based on the data load signal 242. For example, the data load signal 242 may disable loading a respective new value in the input data element register 204 when the zero data element indicator 226 or the NOP 258 is asserted, which may avoid toggling the stored input data element 244. Since the weight 224 has been pre-loaded in the PE 00, the stored weight value 248 does not change during the computations. Thus, dynamic power consumption can be reduced which may have occurred as a result of a multiplication operation performed by the shared multiplier 208.

Examples of the disclosed technologies can provide systems and methods to reduce dynamic power consumption in the PEs using zero detector circuits by skipping multiplication operations with a zero value on the input data element. Additionally, use of the respective zero detector circuits for detecting zeros on the input data elements and the weights entering each row of the systolic array, and passing the zero indicators to all the PEs in the array can minimize the gate count and power consumption as compared to using respective zero detectors within each PE in the array.

Figure 8:
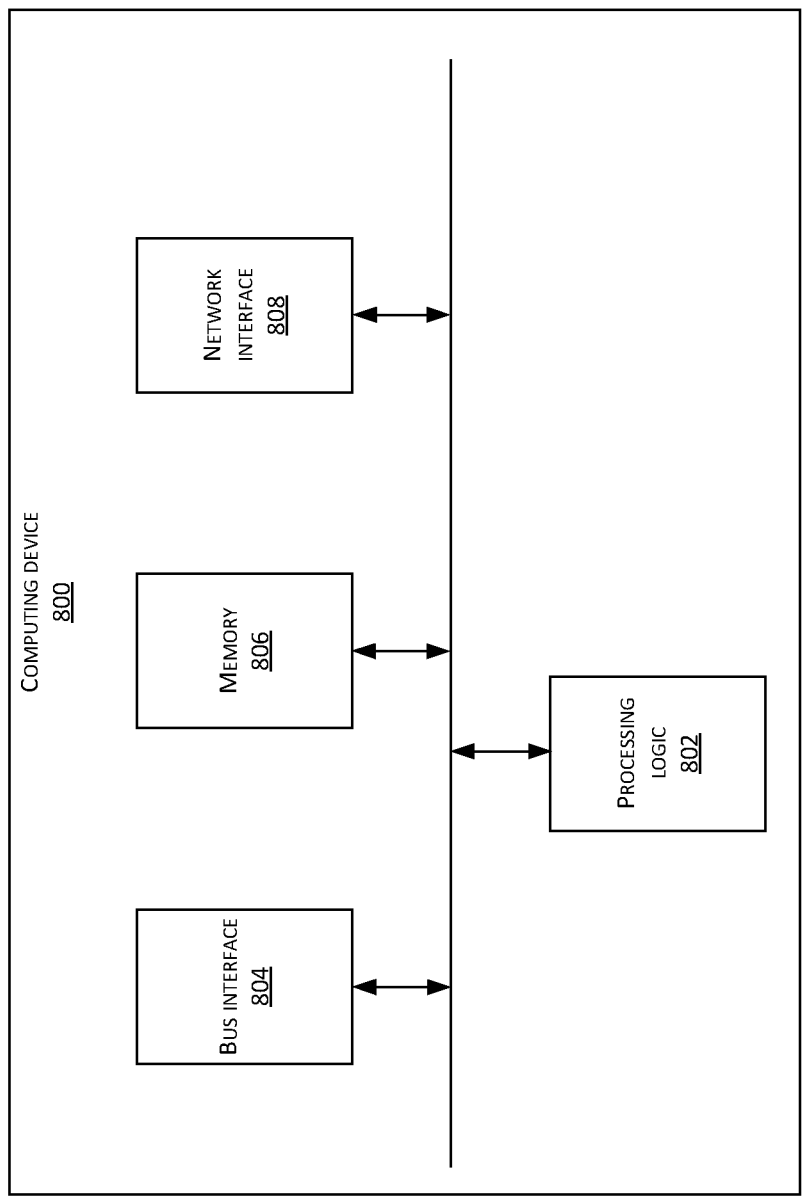
FIG. 8 illustrates an example of a computing device, according to certain aspects of the disclosure.

FIG. 8 illustrates an example of a computing device 800. Functionality and/or several components of the computing device 800 may be used without limitation with other examples disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with data processing) can be allocated to a client upon request.

In one example, the computing device 800 may include processing logic 802, a bus interface module 804, memory 806, and a network interface module 808. These modules may be hardware modules, software modules, or a combination of hardware and software. In certain instances, modules may be interchangeably used with components or engines, without deviating from the scope of the disclosure. The computing device 800 may include additional modules, which are not illustrated here for the ease of illustration. In some implementations, the computing device 800 may include fewer modules. In some implementations, one or more of the modules may be combined into one module. One or more of the modules may be in communication with each other over a communication channel 810. The communication channel 810 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating-point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 806. The processing logic 802 may also include hardware circuities for performing artificial neural network computations including, for example, the neural network processor 602, etc.

The access to the processing logic 802 can be granted to a client to provide the personal assistant service requested by the client. For example, the computing device 800 may host a virtual machine, on which an image recognition software application can be executed. The image recognition software application, upon execution, may access the processing logic 802 to predict, for example, an object included in an image.

As another example, access to the processing logic 802 can also be granted as part of bare-metal instance, in which an image recognition software application executing on a client device (e.g., a remote computer, a smart phone, etc.) can directly access the processing logic 802 to perform the recognition of an image.

The memory 806 may include either volatile or non-volatile, or both volatile and non-volatile types of memory. The memory 806 may, for example, include random access memory (RAM), read only memory (ROM), Electrically Erasable Programmable Read-Only Memory (EEPROM), flash memory, and/or some other suitable storage media. In some cases, some or all of the memory 806 may be internal to the computing device 800, while in other cases some or all of the memory may be external to the computing device 800. The memory 806 may store an operating system comprising executable instructions that, when executed by the processing logic 802, provides the execution environment for executing instructions providing functionality to perform convolution computations for the computing device 800. The memory 806 may also store, for example, software applications for performing artificial neural network computations. The memory may also store and maintain several data structures and tables for facilitating the functionality of the computing device 800.

The bus interface module 804 may enable communication with external entities, such as a host device and/or other components in a computing system, over an external communication medium. The bus interface module 804 may include a physical interface for connecting to a cable, socket, port, or other connection to the external communication medium. The bus interface module 804 may further include hardware and/or software to manage incoming and outgoing transactions. The bus interface module 804 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 804 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 808 may include hardware and/or software for communicating with a network. This network interface module 808 may, for example, include physical connectors or physical ports for wired connection to a network, and/or antennas for wireless communication to a network. The network interface module 808 may further include hardware and/or software configured to implement a network protocol stack. The network interface module 808 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some examples, the computing device 800 may receive a set of parameters, such as the aforementioned weight values for convolution computations, from a server through network interface module 808.

The various components and modules of the computing device 800, described above, may be implemented as discrete components, as a System on a Chip (SoC), as an ASIC, as an NPU, as an FPGA, or any combination thereof. In some examples, the SoC or other component may be communicatively coupled to another computing system to provide various services such as traffic monitoring, traffic shaping, computing, etc. In some examples of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

Figure 9:
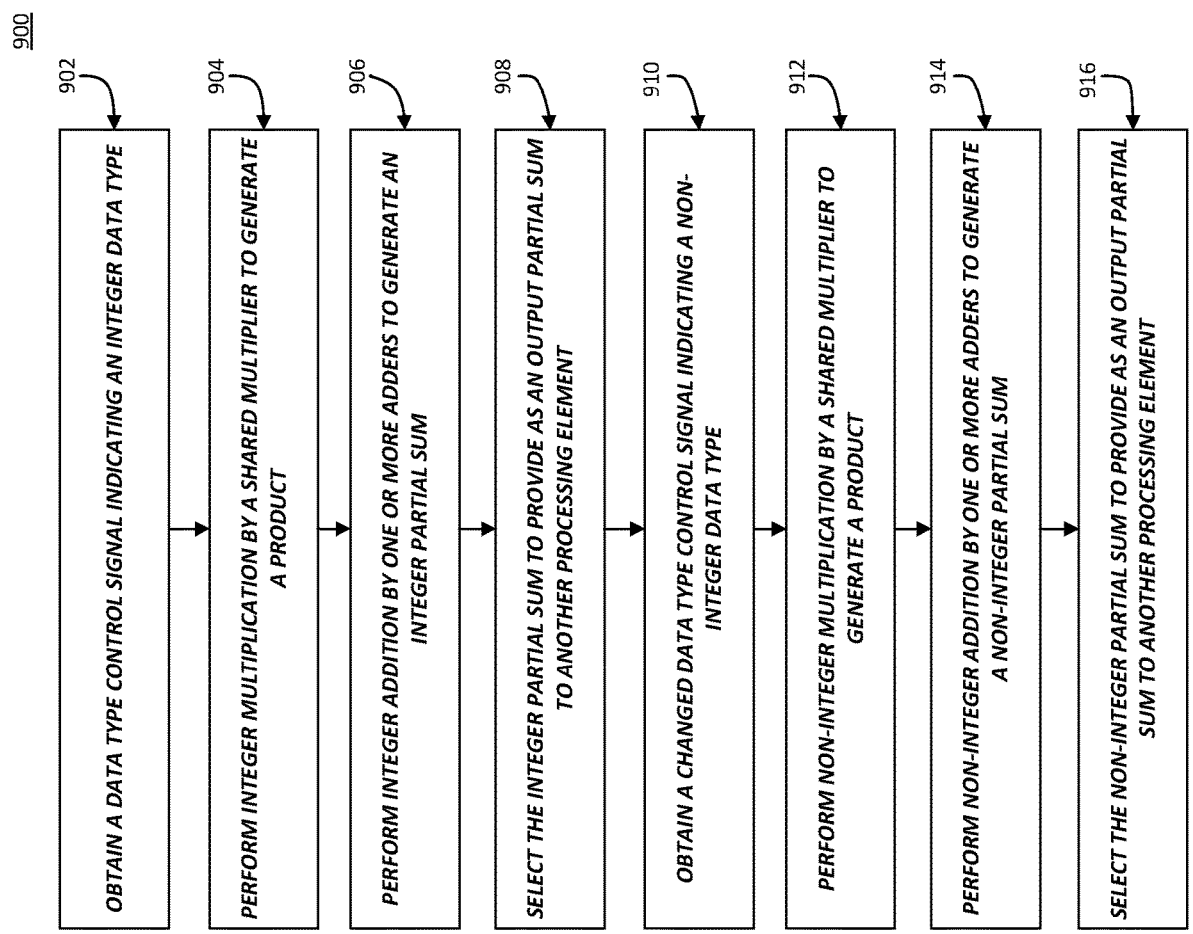
FIG. 9 shows a method executed by a processing element for neural network computations, the computations involving both integer and non-integer operations.

FIG. 9 shows a method 900 executed by a PE for neural network computations, according to some examples of the disclosed technologies. The PE may be part of the systolic array 302, e.g., the PE 00, as seen in FIG. 3.

In a step 902, the PE may obtain a data type control signal indicating an integer data type. The PE may obtain the data type control signal via a row input bus, such as row input bus 102 as shown in FIG. 2. The PE may additionally or alternatively obtain the data type control signal be decoding an opcode, decoding a format of the weight, decoding a format of the input data element, or decoding some other similar indicator. As discussed with reference to FIG. 2C and FIG. 2D, the data type control signals 235 and its delayed version 241 may be used in PE's configured to perform multiply-delayed-accumulate.

In a step 904, the PE may perform an integer multiplication operation between the stored input data element and the stored weight value to generate an integer product based on the stored input data element and the stored weight value. In some examples, such as shown in FIG. 2A and FIG. 2C, a non-integer multiplication operation can also be performed to generate a non-integer product, but the non-integer product can be selectively disregarded based on the data type control signal indicating the integer data type. The integer multiplication can be performed using a shared multiplier.

In a step 906, the PE may perform an integer addition operation between the stored input partial sum and the integer product to generate an integer partial sum. In some examples, such as described with respect to FIG. 2B and FIG. 2D, a separate adder can also perform an unselected non-integer (e.g., floating-point or bfloat) addition in parallel. The integer addition can be performed using a shared adder or a separate integer adder.

In a step 908, the PE may select the integer partial sum to provide as an output partial sum. For example, the PE may select the integer partial sum and disregard the non-integer partial sum. The PE may select the integer partial sum based at least in part on the data type control signal indicating the integer data type.

In a step 910, the PE may obtain a changed data type control signal indicating a non-integer data type, such as FP16 or BF16. The PE may obtain the changed data type control signal via a row input bus, such as row input bus 102 as shown in FIG. 2. The PE may additionally or alternatively obtain the changed data type control signal be decoding an opcode, decoding a format of the weight, decoding a format of the input data element, or decoding some other similar indicator.

In a step 912, the PE may perform a non-integer multiplication operation between the stored input data element and the stored weight value to generate a non-integer multiplication product. The non-integer multiplication can be performed using a shared multiplier.

In a step 914, the PE may perform non-integer addition operation between the stored input partial sum and the non-integer product to generate a non-integer partial sum. The non-integer addition can be performed using a shared adder or a separate non-integer adder.

In a step 916, the PE may select the non-integer partial sum to provide as an output partial sum to another processing element. For example, the PE may select the non-integer partial sum and disregard the integer partial sum. The PE may select the non-integer partial sum based at least in part on the data type control signal indicating the non-integer data type.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A systolic multiply accumulate processor comprising:
   a systolic array of processing elements arranged in a first plurality of rows and a second plurality of columns, the systolic array of processing elements configured to operate on input data sets, each processing element of the processing elements comprising:
      a first input port for receiving an input data element;
      a weight register for storing a stored weight value;
      a second input port for receiving an input partial sum;
      an output port for providing an output partial sum;
      a shared multiplier configured to multiply the input data element by the stored weight value, the shared multiplier comprising:
         a first sub-circuit configured to support integer multiplication; and
         a second sub-circuit configured to support floating-point multiplication, wherein at least a shared part of the first sub-circuit is shared with the second sub-circuit, wherein a data type control signal identifies the integer multiplication or the floating-point multiplication, and wherein a non-shared sub-circuit, of the shared multiplier, is disabled based at least partly on the data type control signal;
      a first adder coupled to the second input port, the output port, and the shared multiplier, wherein the first adder is configured to generate an integer partial sum by performing integer addition on an integer product from the shared multiplier and the input partial sum;
      a second adder, different from the first adder, coupled to the second input port, the output port, and the shared multiplier, wherein the second adder is configured to generate a floating-point partial sum by performing floating-point addition on a floating-point product from the shared multiplier and the input partial sum; and
      a selector circuit configured to select, based on the data type control signal, a first output from among the integer partial sum and the floating-point partial sum for providing to the output port as the output partial sum and a second output from among the integer partial sum and the floating-point partial sum to disregard.

2. The systolic multiply accumulate processor of claim 1, wherein:
the first sub-circuit is configured to generate a first product by performing the integer multiplication on the input data element and the stored weight value;
the second sub-circuit is configured to generate a second product by performing the floating-point multiplication on the input data element and the stored weight value, wherein the second product includes a significand and an exponent; and
the shared part of the first sub-circuit that is shared with the second sub-circuit is used in generating the first product and is used in generating the significand of the second product.

3. The systolic multiply accumulate processor of claim 1, wherein each processing element in the systolic array of processing elements further comprises:
a multiplexer configured to select between a first product and a second product for providing to the first adder or the second adder based on the data type control signal selecting a data type, wherein at least a part of the second sub-circuit is deactivated or activated based at least in part on the data type control signal.

4. The systolic multiply accumulate processor of claim 1, wherein:
the integer partial sum is an integer data type; and
the floating-point partial sum is a floating-point data type.

5. A systolic circuit comprising:
a processing element coupled in a systolic array of processing elements and configured to communicate data with at least one neighboring processing element in the systolic array, the processing element comprising:
a shared multiplier configured to support both integer multiplication and non-integer multiplication of an input data element and a weight, wherein a shared sub-circuit, of the shared multiplier, that is used to support the integer multiplication is also used to support the non-integer multiplication, wherein a data type control signal identifies the integer multiplication or the non-integer multiplication, and wherein a non-shared sub-circuit, of the shared multiplier, is disabled based at least partly on the data type control signal;
a first adder configured to support integer addition, wherein the first adder is configured to receive one or more products from the shared multiplier and add an input partial sum to at least one product of the one or more products to result in an integer partial sum;
a second adder, different from the first adder, configured to support non-integer addition, wherein the second adder is configured to receive the one or more products from the shared multiplier and add the input partial sum to at least one product of the one or more products to result in a non-integer partial sum; and
a selector circuit configured to select, based on the data type control signal, a first output from among the integer partial sum and the non-integer partial sum to provide to an output port as an output partial sum and a second output from among the integer partial sum and the non-integer partial sum to disregard.

6. The systolic circuit of claim 5, wherein the shared multiplier is configured to perform at least floating-point multiplication and the integer multiplication.

7. The systolic circuit of claim 5, further comprising:
a multiplexer configured to select among a plurality of products generated by the shared multiplier for providing to the first adder or the second adder based on the data type control signal, wherein the plurality of products includes at least an integer product and a floating-point product, wherein the shared multiplier is configured to, based at least in part on the data type control signal, prevent circuitry for floating-point multiplication from contributing to an operation.

8. The systolic circuit of claim 5, wherein:
the non-integer multiplication comprises floating-point multiplication or brain floating-point multiplication; and
the non-integer addition comprises floating-point addition or brain floating-point addition.

9. The systolic circuit of claim 5, wherein the first adder is an integer adder, and wherein the second adder is a floating-point adder or a brain floating-point adder.

10. The systolic circuit of claim 5, wherein:
the processing element further comprises one or more delay registers coupled between the shared multiplier and the first and second adders; and
the first and second adders are configured to receive one or more products from the shared multiplier on a subsequent systolic cycle, wherein the one or more products are generated by the shared multiplier during a prior systolic cycle.

11. The systolic circuit of claim 5, further comprising a skip calculation generator configured to propagate a skip calculation signal to a plurality of processing elements, wherein the skip calculation signal is configured to prevent at least one of the shared multiplier, the first adder, or the second adder for a systolic cycle from contributing to arithmetic computations of the systolic array during the systolic cycle.

12. The systolic circuit of claim 5, wherein the processing element further comprises one or more delay registers coupled between the shared multiplier and the first and second adders.

13. The systolic circuit of claim 5, wherein:
the shared multiplier is selectable to perform at least one of: a single 17-bit integer multiplication or two parallel 9-bit integer multiplications; and
the shared multiplier is selectable to perform at least one of: a single 16-bit brain floating-point multiplication or a single 16-bit floating-point multiplication.

14. The systolic circuit of claim 5, wherein the selector circuit is configured to select from among the integer partial sum and the non-integer partial sum based at least in part on the data type control signal.

15. The systolic circuit of claim 5, further comprising a partial de-quantizer configured to partially de-quantize the input data element for a row of the processing elements, wherein partially de-quantizing the input data element includes shifting the input data element and adding an extra bit to the input data element.

16. The systolic circuit of claim 5, wherein the shared multiplier is selectable to perform at least one of: a single 17 bit integer multiplication, two or more parallel 9 bit integer multiplications, a single 16 bit brain floating-point multiplication, or a single 16 bit floating-point multiplication.

17. A method for systolic processing by a processing element, the method comprising:
obtaining a data type control signal indicating an integer data type;

performing, by a shared multiplier, integer multiplication of a first input data element and an output of a weight register to generate an integer product, wherein a first non-shared sub-circuit, of the shared multiplier, is disabled based at least partly on the data type control signal;

performing, by a first adder, integer addition of a first input partial sum and the integer product to generate an integer partial sum;

selecting, based at least partly on the data type control signal indicating the integer data type, a first output corresponding to the integer partial sum to provide as an output partial sum to another processing element and a second output to disregard;

obtaining a changed data type control signal to indicate a non-integer data type;

performing, by the shared multiplier, non-integer multiplication of a second input data element and the output of the weight register to generate a non-integer product wherein the first non-shared sub-circuit is enabled and a second non-shared sub-circuit, of the shared multiplier, is disabled based at least partly on the changed data type control signal;

performing, by a second adder, different from the first adder, non-integer addition of a second input partial sum and the non-integer product to generate a non-integer partial sum; and selecting, based at least partly on the changed data type control signal indicating the non-integer data type, a third output corresponding to the non-integer partial sum to provide as an output partial sum to another processing element and a fourth output to disregard.

18. The method of claim 17, further comprising:
performing, by multiplier exponent logic in the shared multiplier, a computation of exponent bits in the non-integer product.

19. The method of claim 17, further comprising:
receiving the first input data element, wherein the first input data element is a 9-bit or 17-bit integer; and
performing multiplication on the first input data element and the output of the weight register by the shared multiplier, wherein the shared multiplier is configured to support multiplication of at least one of 9-bit or 17-bit integers.

20. The method of claim 17, wherein the first adder is an integer adder, and wherein the second adder is a floating-point adder or a brain floating-point adder.

* * * * *